United States Patent
Zhao et al.

(10) Patent No.: US 8,594,831 B2
(45) Date of Patent: Nov. 26, 2013

(54) AUTOMATIC PROGRAMMING METHOD AND AUTOMATIC PROGRAMMING DEVICE

(75) Inventors: Bingyan Zhao, Davis, CA (US); Jui-jen Chuang, Davis, CA (US); Jiewu Lu, Davis, CA (US); Meng Wang, Davis, CA (US)

(73) Assignee: Mori Seiki Co., Ltd., Yamatokoriyama-shi, Nara (JP)

( * ) Notice: Subject to any disclaimer, the term of this patent is extended or adjusted under 35 U.S.C. 154(b) by 904 days.

(21) Appl. No.: 12/525,694

(22) PCT Filed: Feb. 8, 2008

(86) PCT No.: PCT/JP2008/052117
§ 371 (c)(1),
(2), (4) Date: Aug. 4, 2009

(87) PCT Pub. No.: WO2008/096847
PCT Pub. Date: Aug. 14, 2008

(65) Prior Publication Data
US 2010/0094450 A1   Apr. 15, 2010

Related U.S. Application Data

(60) Provisional application No. 60/888,950, filed on Feb. 9, 2007.

(51) Int. Cl.
*G06F 19/00* (2011.01)
*G05B 19/00* (2006.01)
*G05B 13/02* (2006.01)
*G06G 7/48* (2006.01)

(52) U.S. Cl.
USPC ............... 700/182; 700/28; 700/29; 700/30; 700/31; 700/32; 700/33; 700/159; 700/184; 700/187; 700/253; 703/7

(58) Field of Classification Search
USPC .................. 700/159, 182, 184, 187
See application file for complete search history.

(56) References Cited

U.S. PATENT DOCUMENTS 4,937,768 A * 6/1990 Carver et al. ............... 703/1
5,023,800 A * 6/1991 Carver et al. ............. 700/182
(Continued)

FOREIGN PATENT DOCUMENTS

JP         01209573 A  *  8/1989  .............. G06F 15/60
JP         04349506 A     12/1992
(Continued)

OTHER PUBLICATIONS

McMahon-C., "CAD/CAM From Priciples to Practice", Addison-Wesley, 1993, p. 294-316,318-327.*
(Continued)

*Primary Examiner* — Kavita Padmanabhan
*Assistant Examiner* — Thomas Stevens
(74) *Attorney, Agent, or Firm* — Westerman, Hattori, Daniels & Adrian, LLP

(57) ABSTRACT

The present invention relates to a conversational automatic programming device or the like capable of generating an NC program in a simpler manner and in a shorter period of time. The automatic programming device is provided with, a machining-profile setting processor in which based on data for specifying a geometric entity selected as a contour shape of a machined portion, out of geometric entities of a geometry defined by two-dimensional CAD data, the geometric entity corresponding to the data is recognized, and based on the recognized geometric entity, a machining profile which is the contour shape of the machined portion is set; a CL-data generating processor for generating tool path data based on the set machining profile; and an NC-program generating processor for generating an NC program based on the generated tool path data. The machining-profile setting processor corrects the recognized geometric entity and/or adds a new geometric entity such that a continuous line without bifurcation all the way from a starting point to an ending point is formable, and thereafter, sets the machining profile.

20 Claims, 17 Drawing Sheets

(56) References Cited

U.S. PATENT DOCUMENTS

| | | | | |
|---|---|---|---|---|
| 5,363,308 A | * | 11/1994 | Guyder | 700/187 |
| 5,396,160 A | * | 3/1995 | Chen | 318/573 |
| 5,432,704 A | * | 7/1995 | Vouzelaud et al. | 700/182 |
| 5,590,046 A | * | 12/1996 | Anderson et al. | 700/171 |
| 5,724,745 A | * | 3/1998 | Brenner et al. | 33/503 |
| 5,917,726 A | * | 6/1999 | Pryor | 700/95 |
| 6,155,148 A | * | 12/2000 | Shinozaki et al. | 82/1.11 |
| 6,512,961 B1 | * | 1/2003 | Fukaya et al. | 700/174 |
| 6,701,200 B1 | * | 3/2004 | Lukis et al. | 700/98 |
| 6,782,306 B2 | * | 8/2004 | Yutkowitz | 700/189 |
| 7,376,480 B2 | * | 5/2008 | Hagen et al. | 700/118 |
| 8,473,092 B2 | * | 6/2013 | Sugata et al. | 700/187 |
| 2003/0033050 A1 | * | 2/2003 | Yutkowitz | 700/189 |
| 2003/0126038 A1 | * | 7/2003 | Lukis et al. | 705/26 |
| 2003/0163208 A1 | * | 8/2003 | Sugiyama et al. | 700/28 |
| 2004/0143362 A1 | * | 7/2004 | Matthews et al. | 700/182 |
| 2005/0228534 A1 | * | 10/2005 | Shibano | 700/182 |
| 2006/0173571 A1 | * | 8/2006 | Hosokawa et al. | 700/177 |

FOREIGN PATENT DOCUMENTS

| | | |
|---|---|---|
| JP | 05204433 A | 8/1993 |
| JP | 08022315 A | 1/1996 |

OTHER PUBLICATIONS

International Search Report of PCT/JP2008/052117, Mailing Date of Mar. 18, 2008, 1 page.

* cited by examiner

Fig. 3
(a) 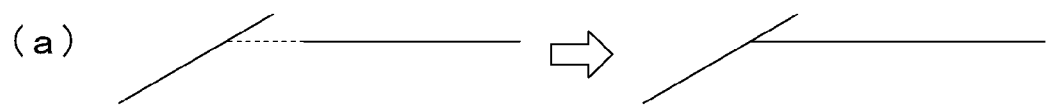
(b) 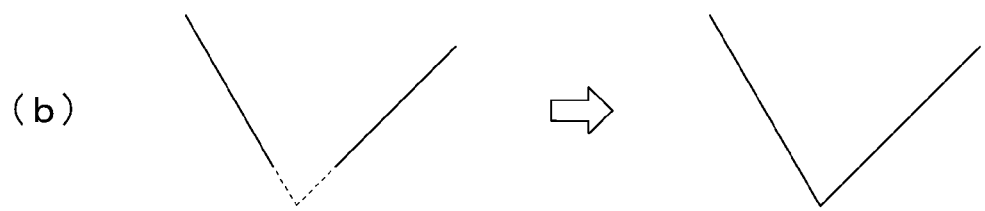
(c) 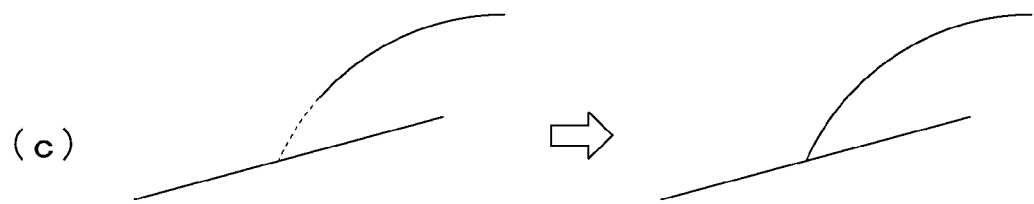
(d) 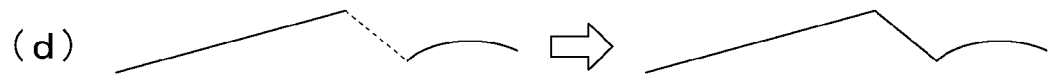
(e) 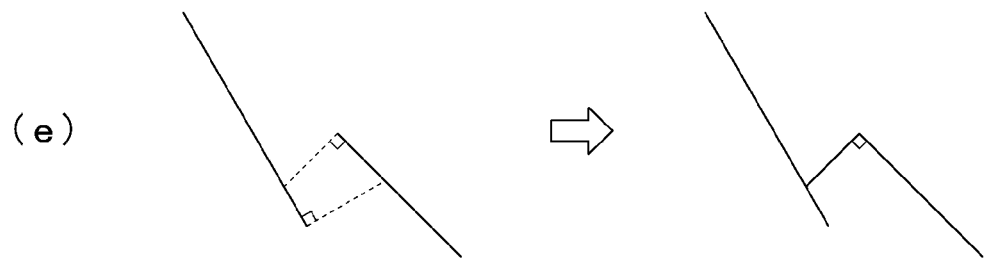

| Types of machining | Tool movement direction |
|---|---|
| Outside diameter turning | Right direction/left direction |
| Inside diameter turning | Right direction/left direction |
| Face turning | Upward direction/downward direction |
| Outside diameter groove turning | Right direction/left direction |
| Inside diameter groove turning | Right direction/left direction |
| Face groove turning | Upward direction/downward direction |

Fig.9

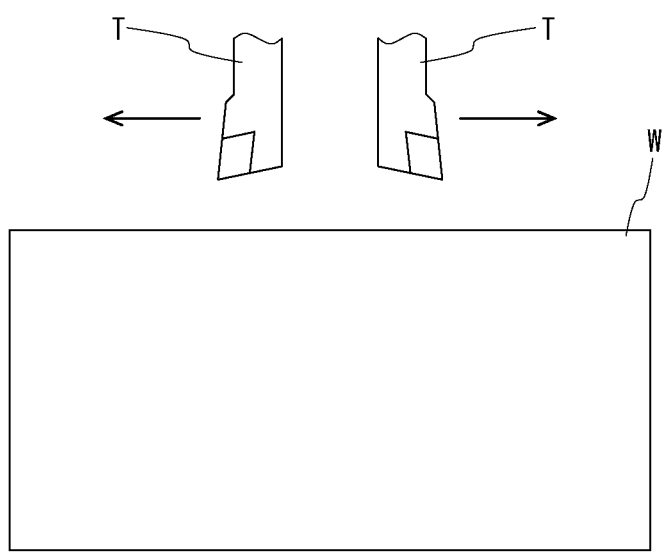

Fig.10

| Types of machining | Machining direction | Entity selection portion |
|---|---|---|
| Outside diameter turning | Upward direction | Above axial line |
| | Downward direction | Below axial line |
| Inside diameter turning | Upward direction | Below axial line |
| | Downward direction | Above axial line |
| Face turning | Upward direction | Below axial line |
| | Downward direction | Above axial line |
| Outside diameter groove turning | Upward direction | Below axial line |
| | Downward direction | Above axial line |
| Inside diameter groove turning | Upward direction | Above axial line |
| | Downward direction | Below axial line |
| Face groove turning | Upward direction | Above axial line |
| | Downward direction | Below axial line |

Fig.11

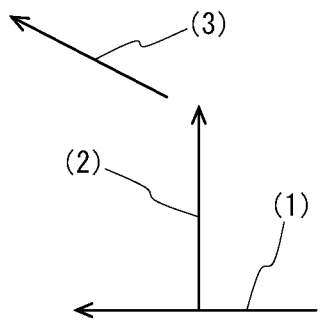

(a)  (b)

AUTOMATIC PROGRAMMING METHOD AND AUTOMATIC PROGRAMMING DEVICE

TECHNICAL FIELD

The present invention relates to an automatic programming method for conversationally generating an NC program for controlling an NC machine tool and an automatic programming device therefor.

BACKGROUND ART

As a device for conversationally generating the NC program, it is conventionally known a numerical controlled device disclosed in Patent document 1, for example. The numerical controlled device is configured to include: an input device for inputting data; a display device for displaying an image; a scanner for scanning a machine drawing having a machining shape drawn on paper; correcting means for receiving the data inputted from the input device while displaying the machine drawing scanned by the scanner on the display device, thereby correcting the machining shape on the machine drawing displayed on the display device; and generating means for accepting the data inputted from the input device and generating an NC program based on the machining shape corrected by the correcting means.

In the numerical controlled device, the machine drawing is scanned by the scanner, and thereafter, by the correcting means, the machine drawing scanned by the scanner is displayed on the displaying device and the data inputted from the input device is accepted, whereby the machining shape on the machine drawing displayed on the displaying device is corrected. Thereafter, by the generating means, the data inputted from the input device is received, and based on the machining shape corrected by the correcting means, the NC program is generated.

Patent document 1; Japanese Unexamined Patent Publication No. 5-204433

DISCLOSURE OF INVENTION

Problem Invention is to Solve

However, in the conventional numerical controlled devices, it is necessary to correct the machining shape of the machine drawing scanned by the scanner, and thus, there is a problem in that its correction task is troublesome, and in addition, it takes time to generate the NC program.

More specifically, in the case where a machining center is used to machine a workpiece W to a shape as shown in FIG. 21, for example, when an NC program for machining a pocket hole H as illustrated in the figure in the workpiece W is generated, it is necessary to correct the machining shape of the machine drawing as shown in FIG. 22 to that as shown in FIG. 23. Alternatively, in the case where a lathe is used to machine a workpiece W to a shape as shown in FIG. 25, for example, when an NC program for machining the workpiece W to an external shape as shown in FIG. 26 is generated, it is necessary to correct the machining shape of the machine drawing as shown in FIG. 25 to that as shown in FIG. 26.

Such problems are generated not only in the above-described conventional numerical controlled devices, but also similarly generated in a conversational programming device configured such that CAD data is imported and out of geometric entities of a geometry defined by the imported CAD data, a geometric entity which corresponds to a contour shape of a portion to be machined is selected and designated.

That is, when the NC program for machining the pocket hole H as shown in FIG. 21 in the workpiece W is generated, it is necessary that the imported CAD data (see FIG. 22) is corrected as shown in FIG. 23, and thereafter, the corrected geometric entity is selected and designated. When the NC program for turning the workpiece W to an external shape as shown in FIG. 26 is generated, it is necessary that the imported CAD data (see FIG. 25) is corrected as shown in FIG. 26, and thereafter, the corrected geometric entity is selected and designated. The reason for this is as follows: when the geometric entity as shown in FIG. 24 is selected and designated, the contour shape of the machined portion cannot be clearly specified because both sides of a line L are bifurcated. Further, when the geometric entities (portions indicated by thick solid lines) as shown in FIG. 27 are selected and designated, the lines are not connected, that is, a shape formed after all machining are complete is defined in the CAD data and a shape formed after rough cutting is not defined therein, and therefore, similar to the above-descried case, the contour shape of the machined portion cannot be clearly specified.

The present invention has been devised in view of the above situations, and an object thereof is to provide an automatic programming method capable of generating an NC program in a simpler manner and a shorter period of time, and an automatic programming device therefor.

Means for Resolving the Problem

The present invention to achieve the above-described objects relates to an automatic programming method, the method being conversationally generating an NC program for controlling an NC machine tool, the automatic programming method configured to execute:

an importing step for importing previously-created two-dimensional CAD data into setting means for setting a machining profile which is a contour shape of a portion to be machined by the NC machine tool;

an inputting step for inputting into the setting means data for specifying a geometric entity which is selected as the contour shape of the machined portion, out of geometric entities of a geometry defined by the two-dimensional CAD data imported by the importing step;

a machining-profile setting step in which by the setting means, based on selected-entity specifying data inputted in the inputting step, a geometric entity corresponding to the selected-entity specifying data is recognized, and based on the recognized geometric entity, the machining profile is set;

a Cutter Location-data (CL-data) generating step for generating, based on the machining profile set in the machining-profile setting step, tool path data related to a movement path of a tool moving along at least the machining profile; and an NC-program generating step for generating the NC program by converting the tool path data generated in the CL-data generating step, the automatic programming method, wherein the machining-profile setting step comprises:

a selected-entity recognizing step for recognizing, based on the selected-entity specifying data inputted in the inputting step, the geometric entity corresponding to the selected-entity specifying data, a selected-entity correcting step in which by the geometric entity recognized in the selected-entity recognizing step, whether it is possible to form a continuous line without bifurcation all the way from a starting point to an ending point is confirmed, and when it is not possible to form, the recognized geometric entity is corrected and/or a new geometric entity is added, whereby the continuous line is made to be formable; and a profile-setting step in which when by the geometric entity recognized in the selected-entity recognizing step, the continuous line is formable, and by the step in the selected-entity correcting step, the continuous line becomes formable, based on the geometric entity from which the continuous line is formable, the machining profile is set.

The automatic programming method can be preferably implemented by the following automatic programming device. That is, the automatic programming device is an automatic programming device for conversationally generating an NC program for controlling an NC machine tool, the automatic programming, comprising:

CAD-data importing means for importing previously-created two-dimensional CAD data;

machining-profile setting means for recognizing, based on data successively inputted from outside, the data being for specifying a geometric entity selected as a contour shape of a portion to be machined by the NC machine tool, out of geometric entities of a geometry defined by the two-dimensional CAD data imported by the CAD-data importing means, each of the geometric entities corresponding to the data, and based on the recognized geometric entities, setting a machining profile which is the contour shape of the machined portion;

CL-data generating means for generating, based on the machining profile set by the machining-profile setting means, tool path data related to a movement path of a tool moving along at least the machining profile;

NC-program generating means for generating the NC program by converting the tool path data generated by the CL-data generating means, wherein the machining-profile setting means comprises:

a selected-entity recognizing section for recognizing, based on selected-entity specifying data successively inputted from outside, each of the geometric entities corresponding to the selected-entity specifying data;

a selected-entity correcting section in which by each of the geometric entities recognized by the selected-entity recognizing section, whether it is possible to form a continuous line without bifurcation all the way from a starting point to an ending point is confirmed, and when it is not possible to form, the recognized geometric entities are corrected and/or a new geometric entity is added, whereby the continuous line is made to be formable; and a profile setting section in which when by the geometric entities recognized by the selected-entity recognizing section, the continuous line is formable, and when by the process in the selected-entity correcting section, the continuous line becomes formable, based on the geometric entity from which the continuous line is formable, the machining profile is set.

According to the automatic programming device, the two-dimensional CAD data which is previously created by using a CAD device or the like is firstly imported by the CAD-data importing means. Examples of the two-dimensional CAD data include those created of a DXF format or an IGES format, but the examples are not limited thereto.

Subsequently, the data (the selected-entity specifying data) for specifying the geometric entity selected as the contour shape of the portion to be machined by the NC machine tool, out of the geometric entities of a geometry defined by the two-dimensional CAD data imported by the CAD-data importing means, is successively inputted from outside. The data is accepted by the machining-profile setting means, and then, by the machining-profile setting means, based on the selected-entity specifying data, each of the geometric entities corresponding to the selected-entity specifying data is recognized. Based on the recognized geometric entities, the machining profile or contour shape of the machined portion is set.

More specifically, firstly, by the selected-entity recognizing section, based on the selected-entity specifying data successively inputted from outside, each of the geometric entities corresponding to the selected-entity specifying data is recognized. Thereafter, it is confirmed by the selected-entity correcting section whether it is possible to form a continuous line without bifurcation all the way from a starting point to an ending point by each geometric entity recognized. When not possible to form the continuous line, the recognized geometric entities are corrected and/or a new geometric entity is added to so that the continuous line can be formed. When it is possible to form the continuous line by the geometric entities recognized by the selected-entity recognizing section and when it becomes possible to form the continuous line by the process in the selected-entity correcting section, based on the geometric entity from which the continuous line can be formed, the machining profile is set by the profile setting section.

Examples of the geometric entity include a line, a polyline, an arc, and a spline, but the examples are not limited thereto. The reason for enabling to form the continuous line without bifurcation all the way from a starting point to an ending point by correcting the geometric entity and/or adding the new geometric entity is to enable to clearly specify the contour shape of the machined portion.

Thereafter, based on the machining profile thus set, the tool path data related to a movement path of a tool moving along at least this machining profile is generated by the CL-data generating means. Subsequently, by the NC-program generating means, the tool path data generated by the CL-data generating means is converted and the NC program is generated. Thus, the NC program for machining the machined portion by the NC machine tool is generated.

Therefore, according to the automatic programming method and the automatic programming device according to the present invention, the two-dimensional CAD data is imported, and thereafter, the machining profile can be set simply by inputting the selected-entity specifying data, and it is not necessary to correct the geometric entity, and so on. Thus, the NC program can be generated in a simpler manner and a shorter period of time.

Further, since the continuous line without bifurcation all the way from the starting point to the ending point can be formed without causing a trouble to an operator, it becomes possible to effectively prevent the operator from making an error resulting from the operator's correction of the geometric entity and so on.

With respect to the geometric entities recognized by the selected-entity recognizing section, the selected-entity correcting section confirms whether the adjacent two geometric entities have an intersection and whether the intersection forms one ends of these geometric entity. When the adjacent two geometric entities have the intersection and the intersection does not form the one ends of these geometric entities, the selected-entity correcting section may be configured to perform a process in which one or both of the two geometric entities are extended and shrunk to make the one ends of these geometric entities to coincide, or a process in which a new geometric entity is added between the two geometric entities, or a new geometric entity is added between the two geometric entities and one or both of the two geometric entities are extended or shrunk, and by the added geometric entity, the one ends of the two geometric entities are connected.

The selected-entity correcting section may be configured by: a first processor for confirming, with respect to the geometric entities recognized by the selected-entity recognizing section, whether the two adjacent geometric entities have an intersection, and when the two adjacent geometric entities do not have the intersection, extending one or both of the two geometric entities to connect the geometric entities, or adding a new geometric entity between the two geometric entities to connect the both geometric entities; and a second processor for confirming whether ends of the two geometric entities in which whether having the intersection is confirmed by the first processor coincide, or whether each of the ends of the geometric entity newly added by the first processor coincides with ends of one and the other of the two geometric entities, and when not coinciding, shortening one or both of the two geometric entities such that the ends of the geometric entity coincide.

In this way, by the selected geometric entity and/or the added geometric entity, a continuous line without bifurcation all the way from a starting point to an ending point can be effectively formed.

The selected-entity correcting section may further comprise a third processor, the third processor being executed after the process in the second processor, for confirming whether the geometric entities recognized by the selected-entity recognizing section intersect another geometric entity other than the geometric entities to be adjacent thereto, and when not intersecting, setting the machining profile to the profile setting section. In this way, the contour shape of the machined portion becomes indefinite, and thus, it becomes possible to surely prevent generating a mistake at the time of the machining profile setting by the profile setting section.

The first processor may be configured to adopt a connecting mode in which an area of the machined portion to be removed from the workpiece by machining is minimized as much as possible (that is, the shape of the workpiece after machining the machined portion is maximized as much as possible) if there are a plurality of connecting modes upon connecting the both geometric entities by extending one or both of the two geometric entities, or adding the new geometric entity between the two geometric entities when the two adjacent geometric entities do not have the intersection. In this way, it becomes possible to effectively prevent an excessive machining (excessive cutting) at the time of machining the workpiece.

The second processor may be configured such that with respect to the geometric entities recognized by the selected-entity recognizing section or the geometric entities recognized by the selected-entity recognizing section and the geometric entity added by the first processor, a starting point and an ending point are set, and thereafter, one or both of the two adjacent geometric entities are shortened to make the starting point and the ending point of the geometric entities to coincide. In this way, it is effective to make each end of the geometric entity to coincide.

Effects of the Invention

As described above, according to the automatic programming method and the automatic programming device according to the present invention, an NC program can be generated in a simpler manner and a shorter period of time.

BRIEF DESCRIPTION OF THE DRAWINGS

FIG. 3 is an explanatory diagram for explaining a process of a connection processor of the first embodiment;

FIG. 8 is an explanatory diagram for explaining types of machining of turning and a tool movement direction at the time of turning;

FIG. 9 is an explanatory diagram for explaining the tool movement direction at the time of turning;

FIG. 10 is an explanatory diagram for explaining a relationship among types of machining of turning; a machining direction of a geometric entity, which is recognized first of all out of the geometric entities successively recognized and which faces up and down directions; and an entity selection portion;

FIG. 11 is an explanatory diagram for explaining a process of an entity-selection-portion recognizing section of the second embodiment;

LEGEND

Figure 1:
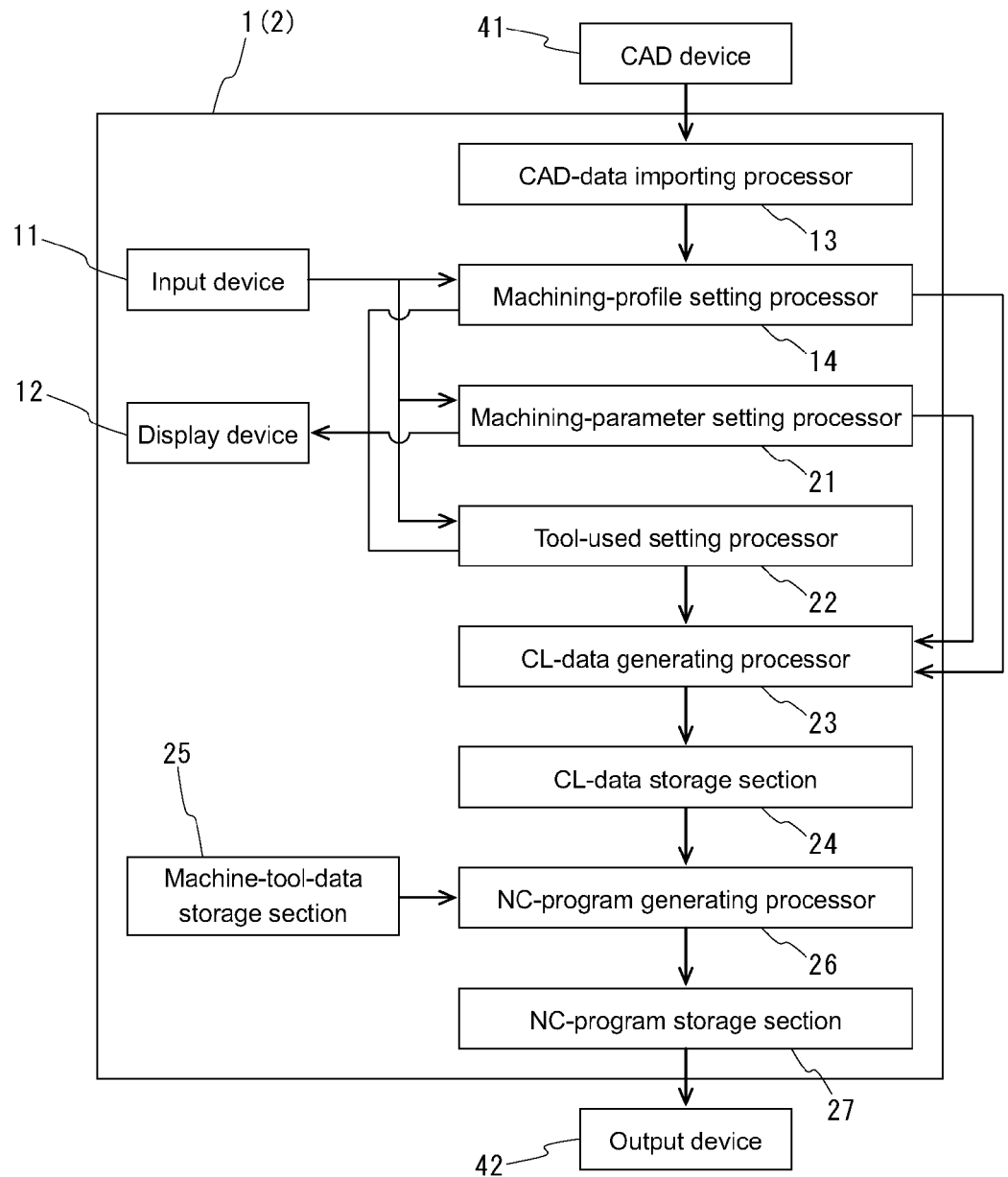
FIG. 1 is a block diagram showing a schematic configuration of automatic programming devices according to first (and second) embodiments of the present invention.

1 Automatic programming device (of first embodiment)
2 Automatic programming device (of second embodiment)
11 Input device
12 Display device
13 CAD-data importing processor
14 Machining-profile setting processor
15 Selected-entity recognizing section
16 Selected-entity correcting section
17 Connection processor
18 Length adjusting processor
19 Verifying processor
20 Profile setting section
21 Machining-parameter setting processor
22 Tool-used setting processor
23 CL-data generating processor
24 CL-data storage section
25 Machine-tool-data storage section
26 NC-program generating processor
27 NC-program storage section
31 Selected-entity recognizing section
32 Entity-selection-portion recognizing section
33 Selected-direction recognizing section
34 Machining-direction recognizing section
35 Selected-entity correcting section
36 Profile setting section

BEST MODE FOR CARRYING OUT THE INVENTION

With reference to accompanying drawings, specific embodiments of the present invention will be described below.

First Embodiment

Figure 2:
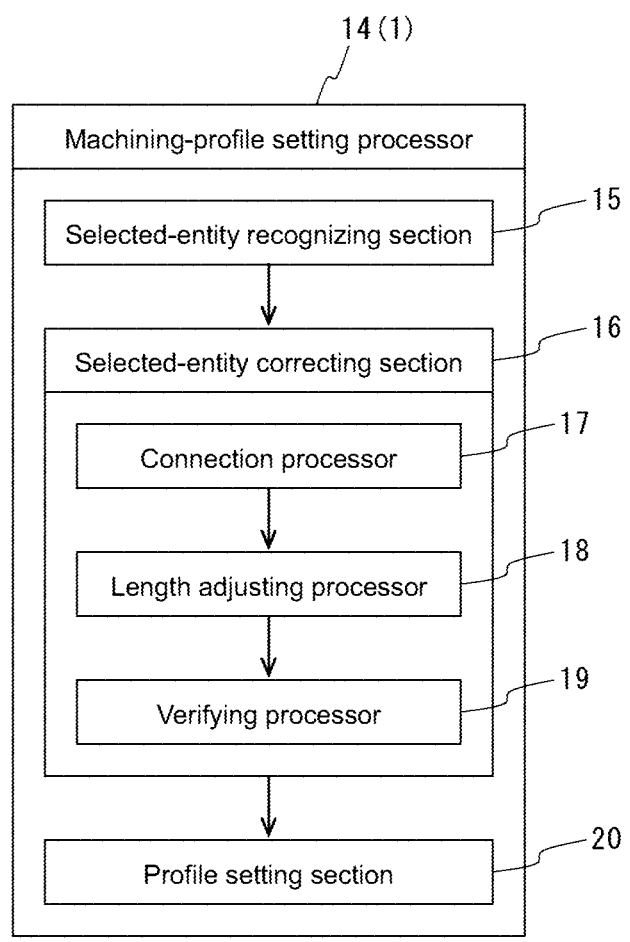
FIG. 2 is a block diagram showing a schematic configuration of a machining-profile setting processor of the first embodiment.
Figure 21:
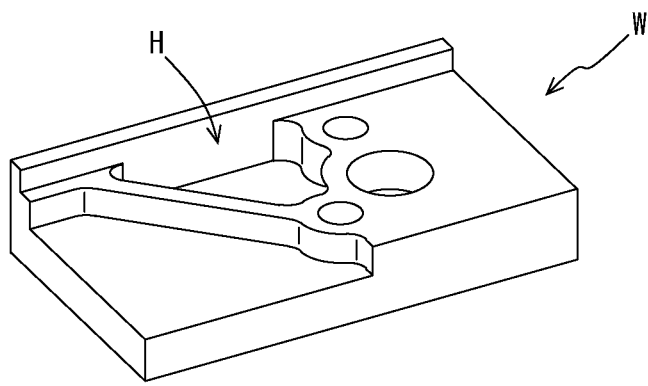
FIG. 21 is a perspective view of a workpiece to be machined.
Figure 22:
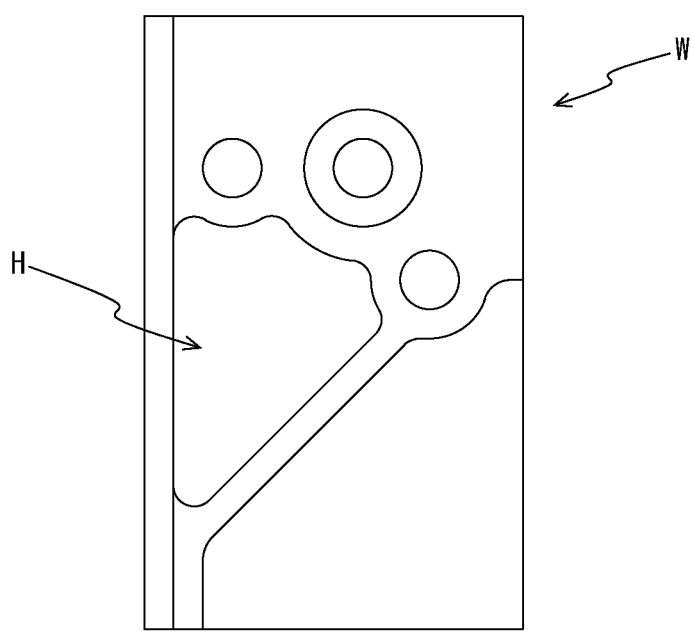
FIG. 22 is a plan view of the workpiece to be machined.
Figure 23:
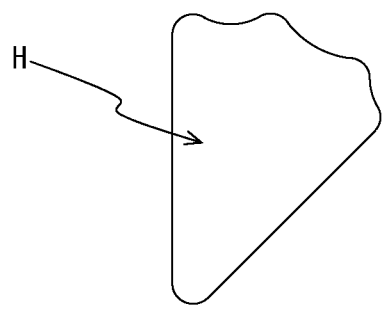
FIG. 23 is an explanatory diagram for explaining a problem in the conventional art.
Figure 24:
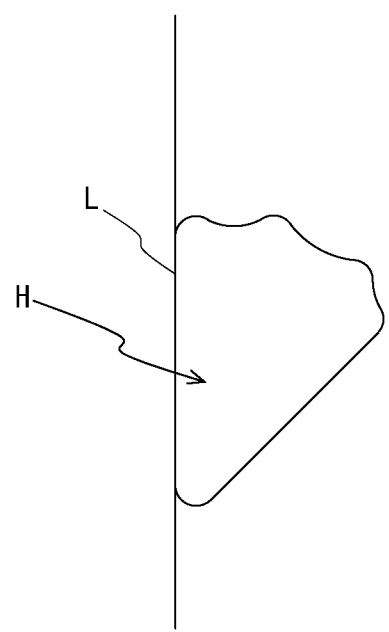
FIG. 24 is an explanatory diagram for explaining a problem in the conventional art.
Figure 25:
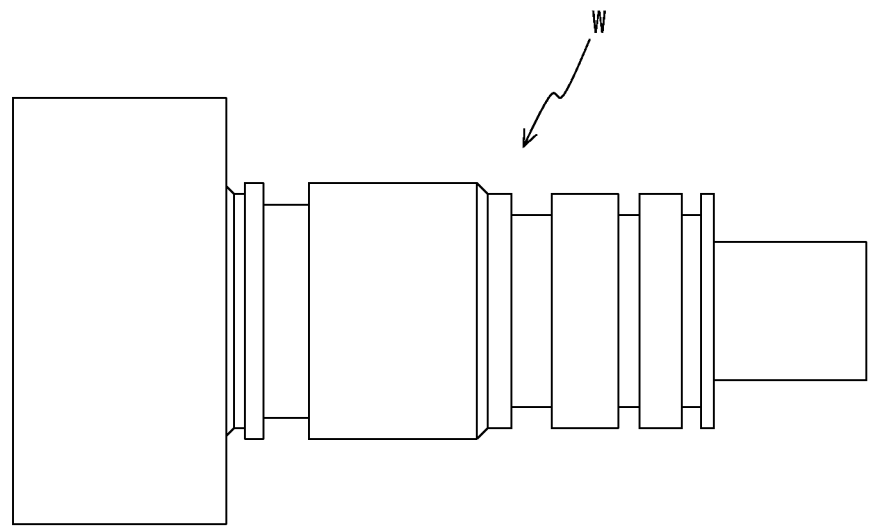
FIG. 25 is a frontal view of the workpiece to be machined.

Firstly, a first embodiment of the present invention will be described. FIG. 1 is a block diagram showing a schematic configuration of an automatic programming device according to the first embodiment of the present invention. FIG. 2 is a block diagram showing a schematic configuration of a machining-profile setting processor according to the first embodiment. The embodiment is described by using, as one example, a case where an NC program for machining a pocket hole H as shown in FIG. 21 to a workpiece W is generated.

As shown in FIG. 1 and FIG. 2, an automatic programming device 1 of a first embodiment is configured to include: an input device 11; a display device 12; a CAD-data importing processor 13; a machining-profile setting processor 14; a machining-parameter setting processor 21; a tool-used setting processor 22; a CL-data generating processor 23; a CL-data storage section 24; a machine-tool-data storage section 25; an NC-program generating processor 26; and an NC-program storage section 27.

The input device 11 serves to input various data. The display device 12 serves to display various images. The CAD-data importing processor 13 is connected to a CAD device 41 for creating two-dimensional CAD data of a DXF format or an IGES format, for example, and performs a process for importing the two-dimensional CAD data created using the CAD device 41.

The machining-profile setting processor 14 performs a process in which based on data (selected-entity specifying data) successively inputted from the input device 11, the data being intended for specifying a geometric entity selected as a contour (boundary) shape of a portion to be machined by an NC machine tool, out of geometric entities of a geometry defined by the two-dimensional CAD data imported by the CAD-data importing processor 13, each of the geometric entities corresponding to the data is recognized, and based on the recognized geometric entities, a machining profile or contour shape of the machined portion is set. When accepting the data, which is inputted from the input device 11, indicating generating an NC program for pocket hole machining, the machining-profile setting processor 14 functions as: a selected-entity recognizing section 15; a selected-entity correcting section 16; and a profile setting section 20. The selected-entity correcting section 16 functions as: a connection processor 17; a length adjusting processor 18; and a verifying processor 19.

The selected-entity recognizing section 15 executes: a process for displaying on the display device 12 the two-dimensional CAD data imported by the CAD-data importing processor 13; a process for accepting the selected-entity specifying data successively inputted from the input device 11; and a process for recognizing, based on the accepted selected-entity specifying data, each of the geometric entities corresponding to the above-described data. In the embodiment, with respect to the geometric entity selected as the contour shape of the machined portion, adjacent geometric entities are selected in order. Examples of the geometric entity include a line, a polyline, an arc, and a spline.

The connection processor 17 confirms whether the two adjacent geometric entities which are recognized by the selected-entity recognizing section 15 are connected to have an intersection. When the two adjacent geometric entities do not have the intersection, the connection processor 17 extends one or both of the two adjacent geometric entities to connect the both geometric entities, or adds a new geometric entity between the two geometric entities to connect the both geometric entities.

More specifically, when determining not having the intersection, the connection processor 17 executes: a first process (see (a), (b), and (c) in FIG. 3) in which one or both of the two geometric entities are extended to connect the both entities; a second process (see FIG. 3(d)) in which a new geometric entity is added between the two geometric entities to connect the both entities such that out of each end of the two geometric entities, the closer ends are connected by a straight line or a curved line; and a third process (see FIG. 3(e)) in which a new geometric entity is added between the two geometric entities to connect the both entities such that a vertical line is drawn to the other geometric entity from an end, which is the closer to the other geometric entity, of one of the two geometric entities.

Which of the processes, i.e., the first, second, and third processes, is executed preferentially is previously set based on the data inputted from the input device 11. For example, when priority of each process is set to an order of the first process, the second process, and the third process, the first process is firstly processed. When the two geometric entities cannot be connected by the first process, the second process is performed; and when the two geometric entities still cannot be connected even by the second process, the third process is performed. As shown in FIG. 3(e), in the third process, when it is not only possible to draw a vertical line to the other geometric entity from an end, which is the closer to the other geometric entity, of one of the two geometric entities, but also possible to draw a vertical line to one geometric entity from an end, which is the closer to the one geometric entity, of the other geometric entity of the two geometric entities, a geometric entity of which vertical line is the shorter is added.

The length adjusting processor 18 confirms whether the ends of the two geometric entities in which whether to have the intersection is confirmed by the connection processor 17 coincide with each other, and also confirms whether each of the ends of the geometric entity newly added by the connection processor 17 coincides with ends of one and the other of the two geometric entities. When not coincident, the length adjusting processor 18 shortens one or both of the two geometric entities such that the ends of the geometric entities coincide.

More specifically, when not being coincident is determined, firstly, a starting point and an ending point are set to the two geometric entities, or to the two geometric entities and the added geometric entity. When the starting point and the ending point are set to the two geometric entities, with respect to the geometric entity which is selected first, out of the two geometric entities, the starting point (the one end) and the ending point (the end on a side of an intersecting portion) are set along a direction in which to advance from one end of the geometric entity, which is selected first, to the intersection portion of the two geometric entities. With respect to the geometric entity which is selected later, out of the two geometric entities, the starting point (the end on the side of the intersecting portion) and the ending point (the one end) are set along a direction in which to advance from the intersecting portion of the two geometric entities toward one end of the geometric entity which is selected later.

On the other hand, when the starting point and the ending point are set to the two geometric entities and the newly added geometric entity, with respect to the geometric entity which is selected first, out of the two geometric entities, the starting point (the one end) and the ending point (the end on the side of the intersecting portion) are set along a direction in which to advance from one end of the geometric entity, which is selected first, toward the intersecting portion with the added geometric entity. With respect to the added geometric entity, the starting point (the intersection with the geometric entity which is selected first) and the ending point (the intersection with the geometric entity which is selected later) are set along a direction in which to advance from the intersection with the geometric entity which is selected first, out of the two geometric entities, toward the intersection with the geometric entity which is selected later, out of the two geometric entities. With respect to the geometric entity which is selected later, out of the two geometric entities, the starting point (the end on the side of the intersecting portion) and the ending point (the one end) are set along a direction in which to advance from the intersecting portion with the added geometric entity toward one end of the added geometric entity.

Figure 4:
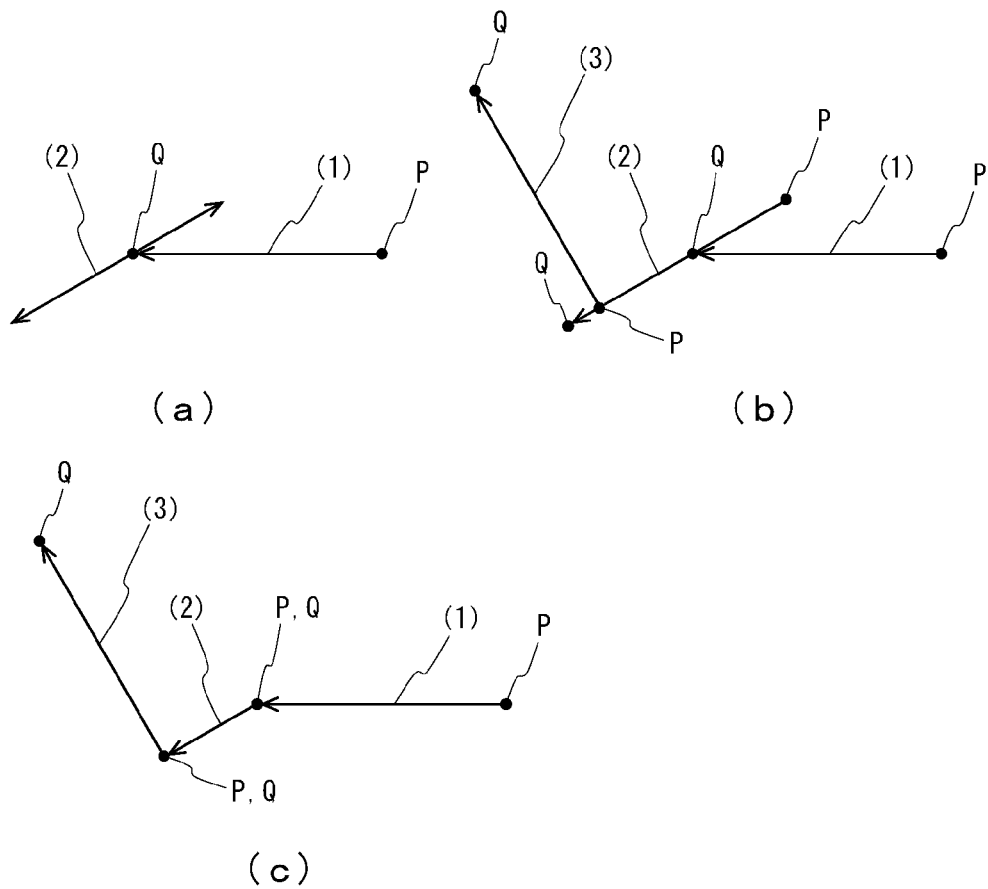
FIG. 4 is an explanatory diagram for explaining a process of a length adjusting processor of the first embodiment.

As shown in FIG. 4(*a*), with respect to the geometric entity (2) which is selected later, when there are two possible directions, i.e., that which advances from the intersecting portion of the two geometric entities toward one end of the geometric entity (2), or that which advances from the intersecting portion with the added geometric entity toward one end of the geometric entity (2), according to a relationship between the geometric entity (2) which is selected later and a geometric entity (3) which is selected still later, as shown in FIG. 4(*b*), one direction is specified, and along this direction, a starting point P and an ending point Q are set. Herein, numeral (1) indicates the geometric entity which is selected first.

The starting point P and the ending point Q are set to the two geometric entities, or to the two geometric entities and the added geometric entity. Thereafter, one or both of the two geometric entities are shortened in length such that the ending point Q of the geometric entity which is selected first coincides with the starting point P of the geometric entity which is selected later, or the ending point Q of the geometric entity which is selected first coincides with the starting point P of the added geometric entity and also the ending point Q of the added geometric entity coincides with the starting point P of the geometric entity which is selected later (see FIG. 4(*c*)).

The verifying processor 19 confirms whether the geometric entity to which the starting point and the ending point are set by the length adjusting processor 18 does not intersect another geometric entity other than the geometric entities to be adjacent thereto. When not intersecting, the verifying processor 19 causes the profile setting section 20 to set the machining profile or contour shape of the machined portion.

Figure 5:
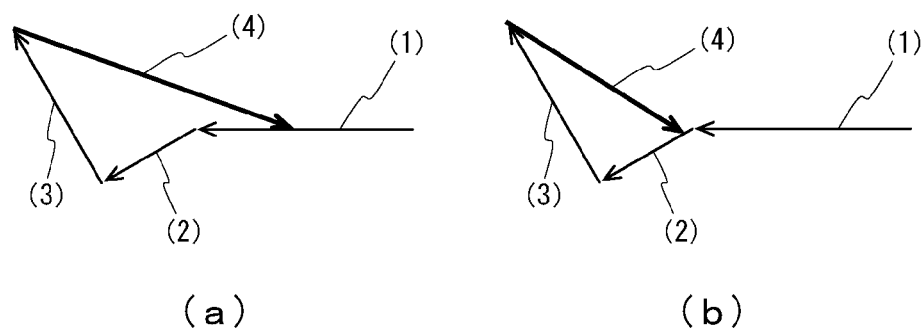
FIG. 5 is an explanatory diagram for explaining a process of a verifying processor of the first embodiment.

More specifically, for example, as shown in FIG. 5(*a*), when a geometric entity (4) subject to verify does not intersect the other geometric entity other than the geometric entities to be adjacent to thereto, not intersecting is determined. On the other hand, as shown in FIG. 5(*b*), when the geometric entity (4) subject to verify intersects the other geometric entity other than the geometric entities to be adjacent to thereto (in the illustrated example, the geometric entity (4) intersects the geometric entity which is selected secondly), intersecting is determined. As a result, an error message is displayed on the display device 12. Herein, numerals (1), (2), (3), and (4) indicate the geometric entities selected successively, and the geometric entities to be adjacent to the geometric entity indicated by numeral (4) are the geometric entities indicated by numerals (1) and (3). The reason is that a closed space is formed by the geometric entities except the geometric entity (1) if the geometric entities to be adjacent to the geometric entity indicated by numeral (4) are the geometric entities indicated by (3) and (2). The geometric entity indicated by numeral (1) is adjacent to the geometric entities indicated by numerals (2) and (4), the geometric entity indicated by numeral (2) is adjacent to the geometric entities indicated by numerals (1) and (3), and the geometric entity indicated by numeral (3) is adjacent to the geometric entities indicated by numerals (2) and (4).

The profile setting section 20 sets the machining profile based on the geometric entity which is confirmed by undergoing each process at the selected-entity recognizing section 15 and the selected-entity correcting section 16 (the connection processor 17, the length adjusting processor 18, and the verifying processor 19) that a continuous line without bifurcation all the way from the starting point to the ending point can be formed, and based also on the geometric entity from which the continuous line becomes formable.

The machining-parameter setting processor 21 performs a process for setting a machining parameter such as a machining condition. The tool-used setting processor 22 performs a process for setting a tool used when machining the machined portion. The machining condition corresponds to a material of a workpiece subject to be machined, a tool used set by the tool-used setting processor 22, or the like. The machining condition is data which is related to a tool feed amount, and a cutting rate, for example.

Based on the machining profile set by the profile setting section 20, the machining parameter set by the machining-parameter setting processor 21, and the tool used set by the tool-used setting processor 22, the CL-data generating processor 23 performs a process for generating tool path data which include a movement path, in a workpiece coordinate system, of the tool used which moves along at least this machining profile, a feed rate of the tool used, a rotational speed thereof, or the like, and stores the generated tool path data in the CL-data storage section 24.

The machine-tool-data storage section 25 is previously stored with data which is related to a type, a structure, or the like of an NC machine tool such as a machining center and an NC lathe. Based on the tool path data stored in the CL-data storage section 24 and the data stored in the machine-tool-data storage section 25, the NC-program generating processor 26 performs a process for generating an NC program by converting the coordinate system to which the movement path of the tool used is set from the work coordinate system into an absolute coordinate system, and stores the generated NC program in the NC-program storage section 27. The NC program stored in the NC-program storage section 27 is adapted to be outputted to outside by the output device 42. The absolute coordinate system is a specific coordinate system set to the NC machine tool. The workpiece coordinate system is that set to a workpiece subject to be machined.

According to the thus-configured automatic programming device 1 of the first embodiment, a predetermined two-dimensional CAD data is imported from the CAD device 41 by the CAD-data importing processor 13. Thereafter, when the selected-entity specifying data inputted from the input device 11 is accepted by the machining-profile setting processor 14, based on the selected-entity specifying data, each of the geometric entities corresponding to the selected-entity specifying data is recognized by the machining-profile setting processor 14. Subsequently, based on the recognized geometric entities, the machining profile is set.

Figure 6:
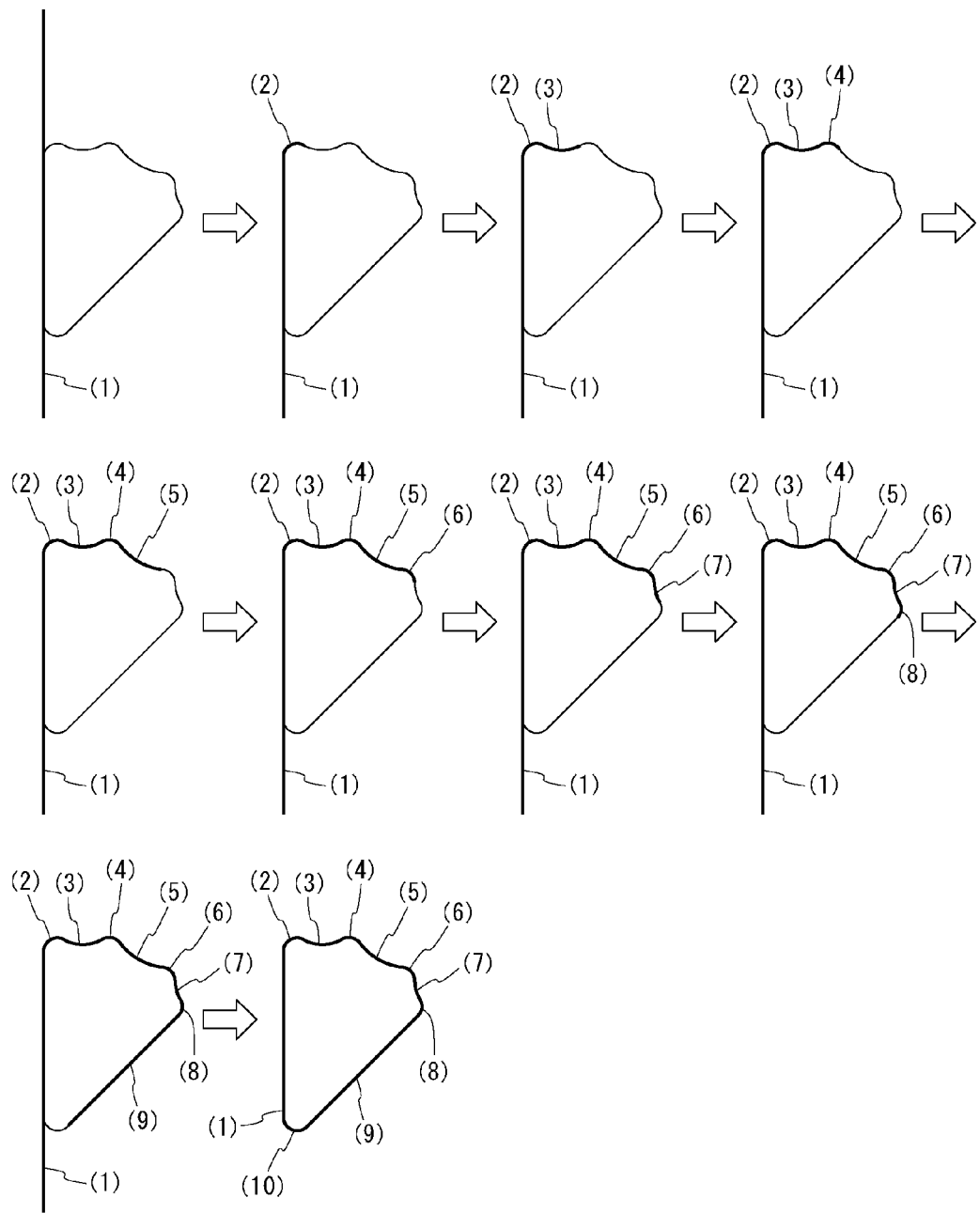
FIG. 6 is an explanatory diagram for explaining about selection of a geometric entity in the first embodiment.

At this time, when the continuous line without bifurcation all the way from the starting point to the ending point cannot be formed by the geometric entities recognized based on the selected-entity specifying data, the recognized geometric entities are corrected, a new geometric entity is added thereto, and lengths of these geometric entities are adjusted. Thereby, the continuous line becomes formable. Thereafter, the machining profile is set. As a result, as shown in FIG. 6, for example, only when geometric entities (1) to (10) of the pocket hole are successively selected, the machining profile can be set. Further, when the continuous line without bifurcation all the way from the starting point to the ending point becomes formable, the contour shape of the machined portion can be clearly specified.

Based on the machining profile thus set, the machining parameter set by the machining-parameter setting processor 21, and the tool used set by the tool-used setting processor 22, the tool path data which includes the movement path, in the workpiece coordinate system, of the tool used which moves at least along the machining profile, the feed rate of the tool used, the rotational speed thereof, or the like, is generated by the CL-data generating processor 23. Based on the generated tool path data and the data stored in the machine-tool-data storage section 25, by the NC-program generating processor 26, the coordinate system to which the movement path of the tool used is set is converted from the workpiece coordinate system into the absolute coordinate system, whereby the NC program is generated.

Thus, according to the automatic programming device 1 according to the embodiment, when the two-dimensional CAD data is imported, and thereafter, the selected-entity specifying data is only inputted, the machining profile can be set. Since it is not required to correct the geometric entity and so on, the NC program can be generated in a simpler manner and in a shorter period of time.

Further, since the continuous line without bifurcation all the way from the starting point to the ending point can be formed without causing a trouble to an operator, it becomes possible to effectively prevent the operator from making an error resulting from the operator's correction of the geometric entity and so on.

Since the continuous line without bifurcation all the way from the starting point to the ending point can be formed by adjusting the lengths of the selected geometric entities and by adding a new geometric entity, such a continuous line can be effectively formed. Further, the machining-profile setting processor 14 is provided with the verifying processor 19, and thus, even when the contour shape of the machined portion becomes unclear, it becomes possible to more surely prevent an error generated at the time of setting the machining profile by the profile setting section 20. Since the starting point and the ending point of each geometric entity are set and the length of each geometric entity is adjusted such that the starting point coincides with the ending point, the end of each of the geometric entities can be effectively made to coincide.

Second Embodiment

Figure 7:
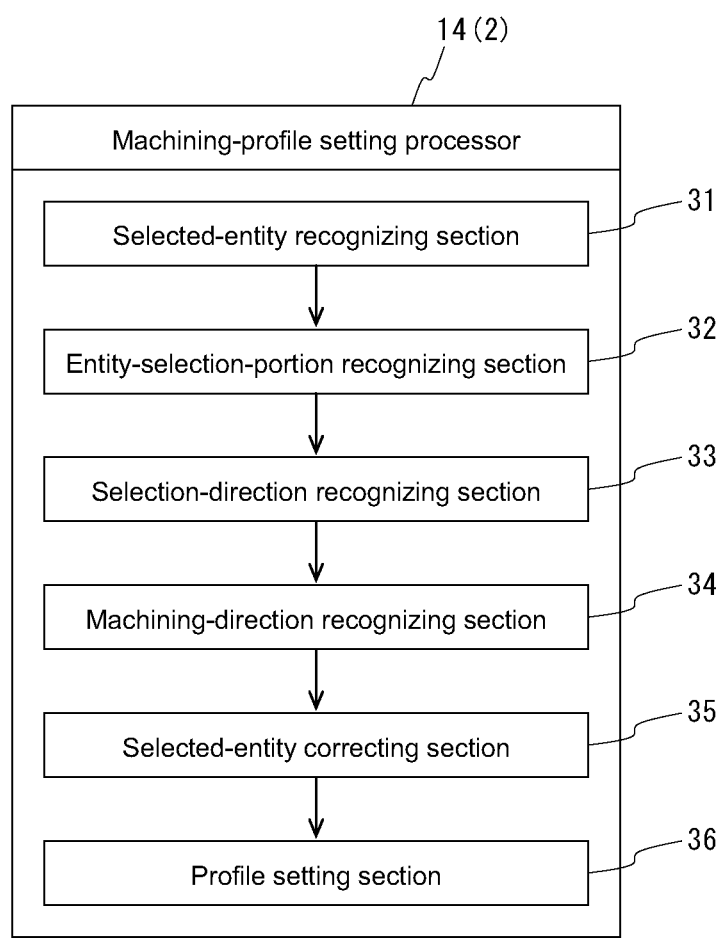
FIG. 7 is a block diagram showing a schematic configuration of a machining-profile setting processor of a second embodiment.
Figure 26:
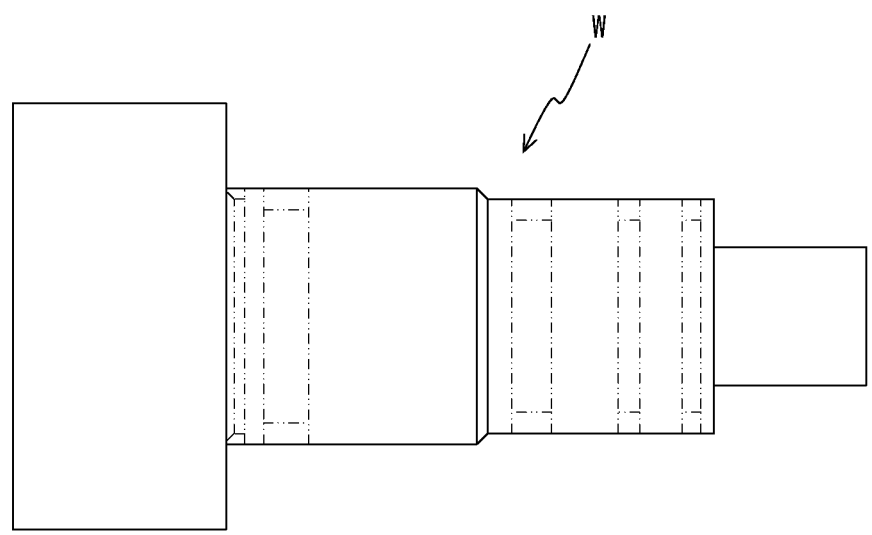
FIG. 26 is an explanatory diagram for explaining a problem in the conventional art.
Figure 27:
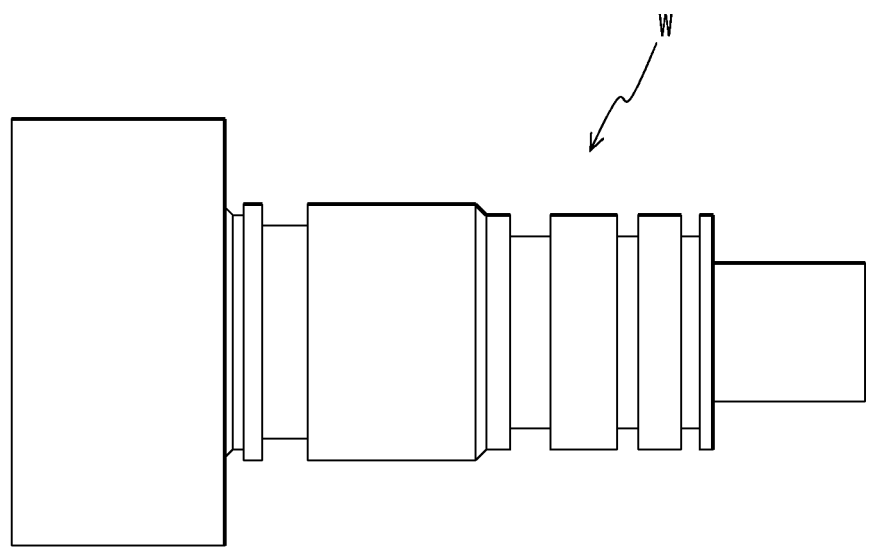
FIG. 27 is an explanatory diagram for explaining a problem in the conventional art.

A second embodiment of the present invention will be described next. FIG. 7 is a block diagram showing a schematic configuration of a machining-profile setting processor according to the second embodiment. The embodiment is described by using, as one example, a case where an NC program for turning a workpiece W into an external shape as shown in FIG. 26 is generated. The constituent components the same as those in the configuration of the automatic programming device 1 according to the first embodiment are denoted by the same numerals, and the detailed description thereof is omitted.

As shown in FIG. 1 and FIG. 7, similar to the automatic programming device 1, an automatic programming device 2 according to the second embodiment is configured to include: the input device 11; the display device 12; the CAD-data importing processor 13; the machining-profile setting processor 14; the machining-parameter setting processor 21; the tool-used setting processor 22; the CL-data generating processor 23; the CL-data storage section 24; the machine-tool-data storage section 25; the NC-program generating processor 26; and the NC-program storage section 27. However, the machining-profile setting processor 14 is configured to execute a process different from that in the first embodiment.

The machining-profile setting processor 14 performs a process in which based on the selected-entity specifying data successively inputted from the input device 11, each of the geometric entities corresponding to the data is recognized, and based on the recognized geometric entities, the machining profile or contour shape of the machined portion is set. When accepting data, which indicates generating an NC program for turning and which is inputted from the input device 11, and data which indicates types of machining of turning and a tool movement direction at the time of turning, the machining-profile setting processor 14 functions as: a selected-entity recognizing section 31; an entity-selection-portion recognizing section 32; a selected-direction recognizing section 33; a machining-direction recognizing section 34; a selected-entity correcting section 35; and a profile setting section 36.

Examples of the types of machining of turning include outside diameter turning, inside diameter turning, face turning, outside diameter groove turning, inside diameter groove turning, and face groove turning, as shown in FIG. 8. Examples of the tool movement direction at the time of turning include right direction and left direction (in the case of the outside diameter turning, the inside diameter turning, the outside diameter groove turning, and the inside diameter groove turning), and upper direction and lower direction (in the case of the face turning and the face groove turning), as shown also in FIG. 8. The tool movement direction at the time of turning indicates an approximate moving of a tool T relative to the workpiece W, as shown in FIG. 9, for example.

Similar to the selected-entity recognizing section 15, the selected-entity recognizing section 31 executes: a process for displaying on the display device 12 the two-dimensional CAD data imported by the CAD-data importing processor 13; a process for accepting the selected-entity specifying data successively inputted from the input device 11; and a process for recognizing, based on the accepted selected-entity specifying data, each of the geometric entities which correspond to the accepted selected-entity specifying data. In the embodiment, with respect to the geometric entity selected as the contour shape of the machined portion, adjacent geometric entities are selected in order. Examples of the geometric entity include a line, a polyline, an arc, and a spline.

With respect to the geometric entities recognized by the selected-entity recognizing section 31, the entity-selection-portion recognizing section 32 performs a process for recognizing an entity selection portion i.e., a process for recognizing whether a geometric entity in an upper portion of an axial line (an axial line of a spindle which supports the workpiece in a manner to rotate freely around the axial line) of the workpiece is selected, or a geometric entity in a lower portion of the axial line of the workpiece is selected. This process is performed because it needs to set machining profiles different depending on whether the geometric entity in the upper portion of the axial line of the workpiece is selected or whether the geometric entity in the lower portion thereof is selected even when the types of machining of turning and the tool movement direction at the time of turning are the same.

More specifically, the entity-selection-portion recognizing section 32 accepts the data indicating the entity selection portion inputted from the input device 11, and based on the accepted data, the entity-selection-portion recognizing section 32 recognizes whether the geometric entity in the upper portion of the axial line of the workpiece is selected, or whether the geometric entity in the lower portion of the axial line of the workpiece is selected.

Alternatively, the entity-selection-portion recognizing section 32 performs a predetermined recognizing process to perform an automatic recognition. In this case, whether a machining direction of the geometric entity, which is recognized first of all out of the geometric entities successively recognized and which faces upward and downward directions, is the upward direction or the downward direction is recognized. Thereafter, the entity selection portion is recognized, based on the recognized machining direction (the upper direction or the lower direction), with reference to data (see FIG. 10) which indicates a relationship between the entity selection portion and the machining direction, set according to the types of machining, of the geometric entity, the geometric entity being recognized first of all out of the geometric entities successively recognized, and being facing the upward and downward directions. For example, in the case where the type of machining of the turning is the outside diameter turning and the tool movement direction at the time of turning is the left direction, as shown in FIG. 11, when the upward direction is determined as to the machining direction of the geometric entity which is recognized first of all out of the geometric entities successively recognized and which faces the upward and downward directions, it is determined that the geometric entity in the upper portion of the axial line of the workpiece is selected. When a recognition result by the automatic recognition is wrong, an operator can input the appropriate entity selection portion from the input device 11.

Figure 12:
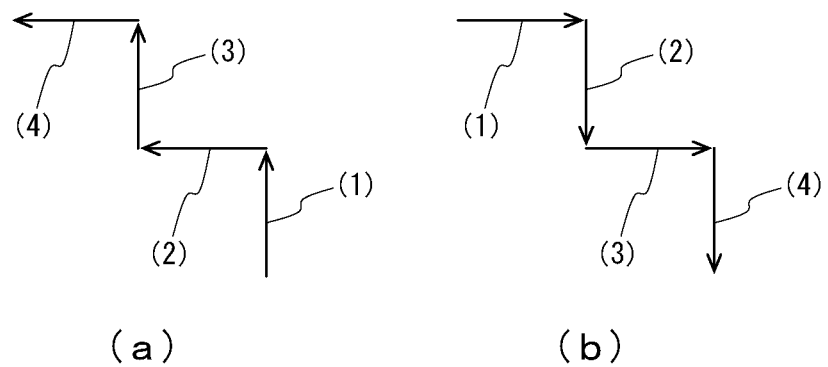
FIG. 12 is an explanatory diagram for explaining a process of a selected-direction recognizing section of the second embodiment.

The selected-direction recognizing section 33 performs a process for recognizing a selection direction indicating along which direction (in what order) the geometric entity is selected based on the geometric entities successively recognized by the selected-entity recognizing section 31. For example, as shown in FIG. 12, when the selection order of the geometric entities is (1), (2), (3), and (4), the selection direction is as indicated by an arrow direction. FIG. 12(a) and FIG. 12(b) illustrate cases where the selection order and the selection direction are contrary to each other.

The machining-direction recognizing section 34 performs a process for recognizing the machining direction indicating along which direction the geometric entity is machined. More specifically, the machining-direction recognizing section 34 classifies the geometric entities successively recognized by the selected-entity recognizing section 31 into those vertical to the tool movement direction at the time of turning and those not vertical thereto, each of which is inputted from the input device 11. With respect to the geometric entities not vertical to the tool movement direction at the time of turning as those indicated by numerals (1), (3), (4), (5), (6), (7), (8), (9), and (11) in FIG. 13, for example, the machining-direction recognizing section 34 recognizes, as the machining direction, the direction the same as the tool movement direction at the time of turning. In the example shown in FIG. 13, the tool movement direction is left direction.

Figure 13:
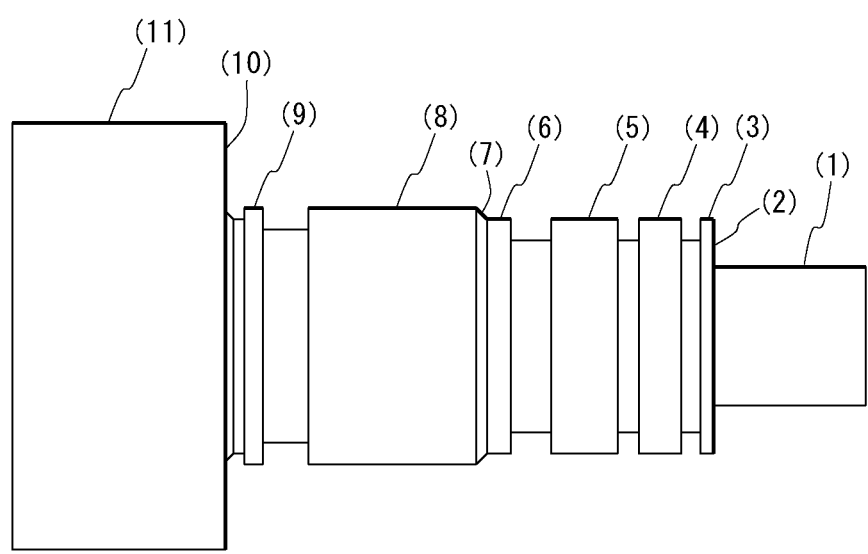
FIG. 13 is an explanatory diagram for explaining a process of a machining-direction recognizing section of the second embodiment.

On the other hand, with respect to the geometric entities vertical to the tool movement direction at the time of turning as those indicated by numerals (2) and (10) in FIG. 13, for example, the machining direction is recognized by using either one of the following two methods. In these methods, a local coordinate system in which an X-axis is set to a direction parallel to the geometric entity vertical to the tool movement direction at the time of turning, and a Z-axis is set to a direction vertical thereto is used.

A first method is firstly described. This method is applied to a case where the geometric entity vertical to the tool movement direction at the time of turning is kept apart from another geometric entity in the X-axis direction, and a direction the same as the selection direction of the geometric entity is recognized as the machining direction.

Figure 14:
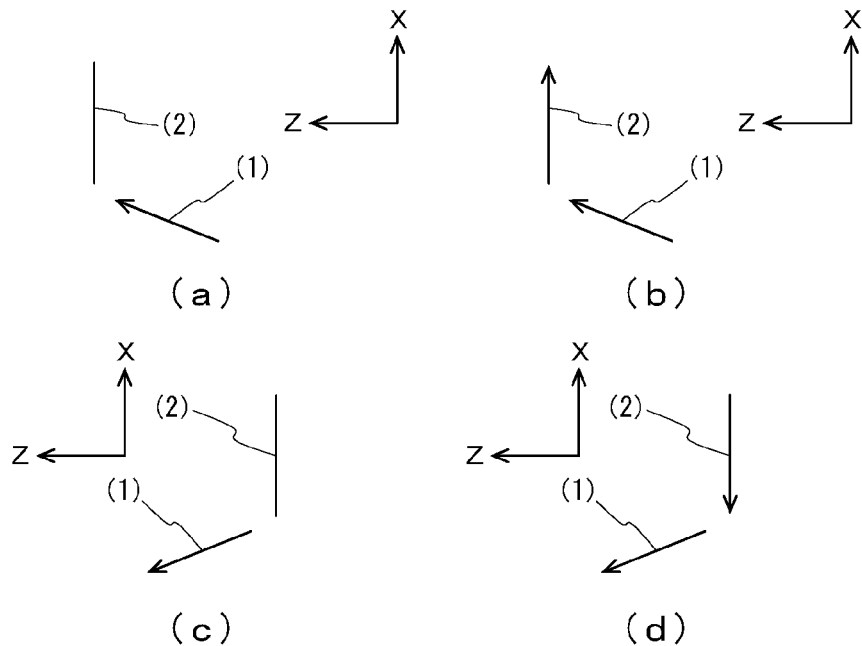
FIG. 14 is an explanatory diagram for explaining a process of the machining-direction recognizing section of the second embodiment.

For example, in the case where the type of machining of turning is the outside diameter turning and the tool movement direction at the time of turning is the left direction, assume that the geometric entities (1) and (2) are successively selected, and the machining direction of the geometric entity (1) is an arrow direction and the selection direction of the geometric entity (2) is a +X direction, as shown in FIG. 14(a). In this case, the machining direction of the geometric entity (2) is as indicated by an arrow direction in FIG. 14(b). Alternatively, in the case where the type of machining and the tool movement direction are the same as those in FIGS. 14(a) and 14(b), assume that the geometric entities (1) and (2) are successively selected, and the machining direction of the geometric entity (1) is an arrow direction and the selection direction of the geometric entity (2) is a −X direction, as shown in FIG. 14(c). In this case, the machining direction of the geometric entity (2) is as indicated by an arrow direction in FIG. 14(d).

A second method is described next. This method is applied to the case where the geometric entity vertical to the tool movement direction at the time of turning is kept apart from another geometric entity in the X-axis direction and is also applied to a case where it is not kept apart therefrom. Firstly, either one of the directions, i.e., the +X direction or the −X direction, is temporarily set as the machining direction of the geometric entity vertical to the tool movement direction at the time of turning. Thereafter, the processes of the selected-entity correcting section 35 and the profile setting section 36 are performed to set the machining profile. Subsequently, whether the set machining profile satisfies a predetermined condition is confirmed. When the predetermined condition is satisfied, the set direction is recognized as the machining direction. When the predetermined condition is not satisfied, a direction opposite to the set direction is recognized as the machining direction.

Examples of the predetermined condition include: (a) whether the machining profile is a continuous line without bifurcation all the way from the starting point to the ending point; (b) a material of the workpiece is continued and exists on one side (a right side or a left side) of the machining profile (it is noted that the one side is set based on the type of machining, the machining direction, and the entity selection portion); (c) whether the machining profile is monotonous in one direction set according to the type of machining; (d) whether the machining direction is restricted by the parameter of the tool used set according to the type of machining; (e) whether the material of the workpiece exists on one side or both sides of the selected geometric entity (this is derived from the fact that the selected geometric entity defines a boundary between the machined portion and a non-machined portion); and (f) whether the machining profile intersects. When all of these conditions are satisfied, it is determined that the predetermined condition is satisfied, and when any one of these conditions is not satisfied, it is determined that the predetermined condition is not satisfied.

Figure 15:
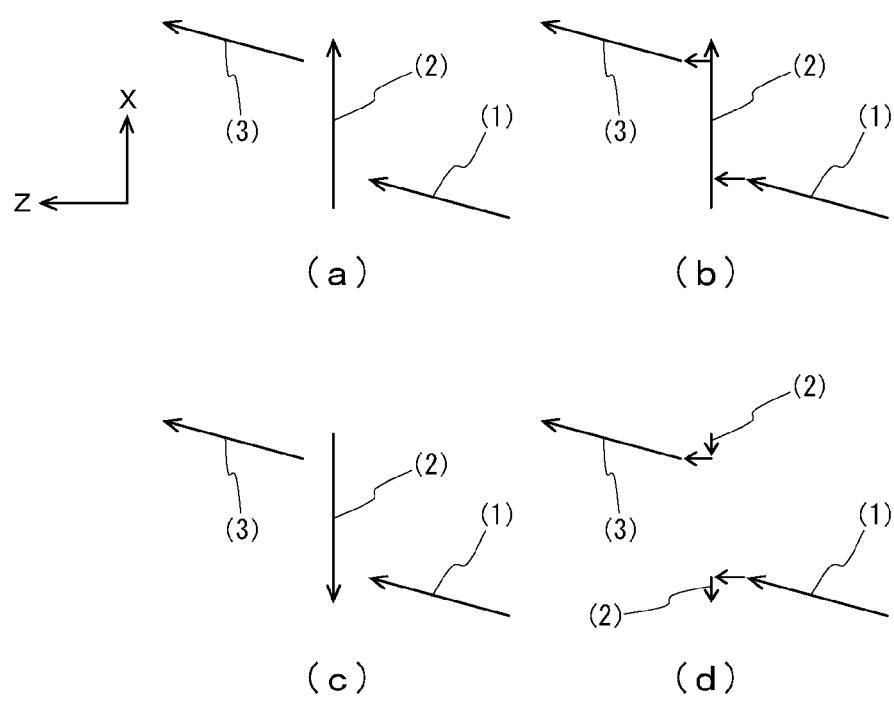
FIG. 15 is an explanatory diagram for explaining a process of the machining-direction recognizing section of the second embodiment.

For example, as shown in FIG. 15(a), in the case where the geometric entities (1), (2), and (3) are successively selected and the machining directions of the geometric entities (1) and (3) are an arrow direction, assume that the machining direction of the geometric entity (2) is the +X direction. In this case, the machining profile set based on the geometric entities and the machining directions is that as indicated in FIG. 15(b), and thus, the predetermined condition is satisfied. On the other hand, as shown in FIG. 15(c), in the case where the geometric entities (1), (2), and (3) are successively selected and the machining directions of the geometric entities (1) and (3) are an arrow direction, assume that the machining direction of the geometric entity (2) is the −X direction. In this case, the machining profile set based on the geometric entities and the machining directions is that which is kept apart as indicated in FIG. 15(d), and thus, the predetermined condition (a) is not satisfied. Therefore, it is determined that the machining direction of the geometric entity (2) is the +X direction.

Figure 16:
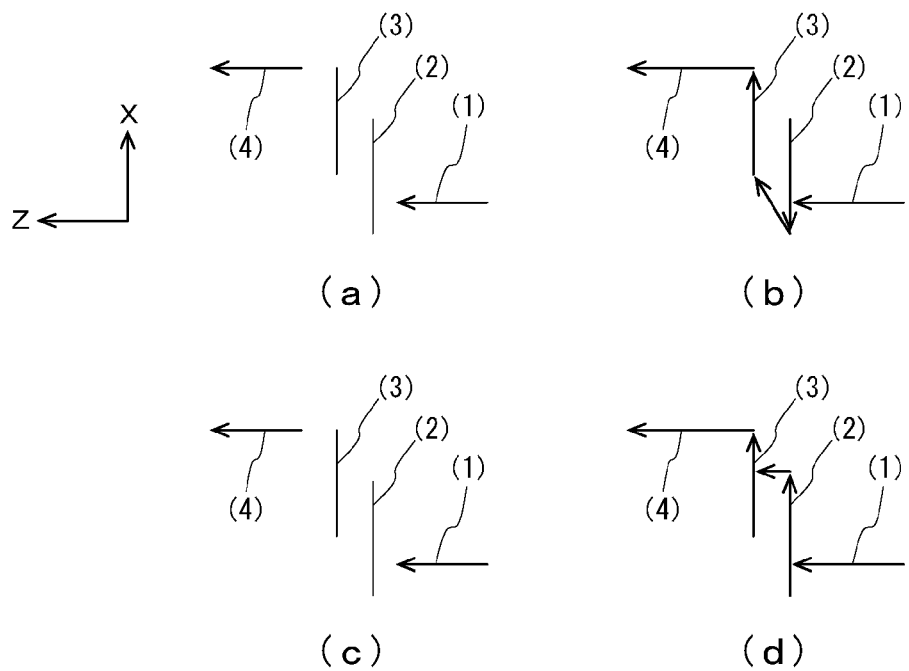
FIG. 16 is an explanatory diagram for explaining a process of the machining-direction recognizing section of the second embodiment.

Alternatively, for example, as shown in FIG. 16(a), in the case where the geometric entities (1), (2), (3), and (4) are successively selected and the machining directions of the geometric entities (1) and (4) are an arrow direction, assume that the machining direction of the geometric entity (2) is the −X direction. In this case, the machining profile set based on the geometric entities and the machining directions is that as indicated in FIG. 16(b), and thus, the material of the workpiece does not exist in either side in the upper portion of the geometric entity (2). As a result, the predetermined condition (e) is not satisfied. On the other hand, as shown in FIG. 16(c), in the case where the geometric entities (1), (2), (3), and (4) are successively selected and the machining directions of the geometric entities (1) and (4) are an arrow direction, assume that the machining direction of the geometric entity (2) is the +X direction. In this case, the machining profile set based on the geometric entities and the machining directions is that as indicated in FIG. 16(d), and thus, the predetermined condition is satisfied. Therefore, it is determined that the machining direction of the geometric entity (2) is the +X direction.

The selected-entity correcting section 35 performs: a first process for confirming whether the two adjacent geometric entities, of which machining direction is recognized by the machining-direction recognizing section 34, have an intersection; a second process for extending one or both of the two geometric entities or adding a new geometric entity between the two geometric entities to connect the both geometric entities when having no intersection is determined in the first process; a third process for confirming whether ends of the two geometric entities in which having the intersection is determined in the first process or ends of the two geometric entities of which one or both ends are extended in the second process coincide, and confirming whether each of the ends of the geometric entity added newly in the second process coincides with ends of one and the other of the two geometric entities: and a fourth process for shortening one or both of the two geometric entities such that the ends of these geometric entities coincide when not coinciding is determined in the third process.

In the second process, similar to the case of the connection processor 17, various connecting modes are adopted such as: one or both of the two geometric entities are extended to connect the both geometric entities; a new geometric entity is added between the two geometric entities such that out of each of the ends of the two geometric entities, the closer ends are connected by a straight line or a curved line to connect the both entities; and in the case where a new geometric entity is added between the two geometric entities to connect the both geometric entities such that a vertical line is drawn to the other geometric entity from an end, which is the closer to the other geometric entity, of one of the two geometric entities, when there are a plurality of connecting modes thereof, a connecting mode in which an area of the machined portion to be removed from the workpiece by machining is minimized as much as possible (that is, the shape of the workpiece after machining the machined portion is maximized as much as possible) is adopted. The machining direction of the newly added geometric entity is to be recognized by the machining-direction recognizing section 34.

In the third process, to the two geometric entities, or to the two geometric entities and the newly added geometric entity, the starting point and the ending point are set along each machining direction. In the fourth process, one or both of the two geometric entities are shortened in length such that out of the two geometric entities, the ending point of the geometric entity which is selected first coincides with the starting point of the geometric entity which is selected later, or such that the ending point of the geometric entity which is selected first coincides with the starting point of the added geometric entity and the ending point of the added geometric entity coincides with the starting point of the geometric entity which is selected later.

Figure 17:
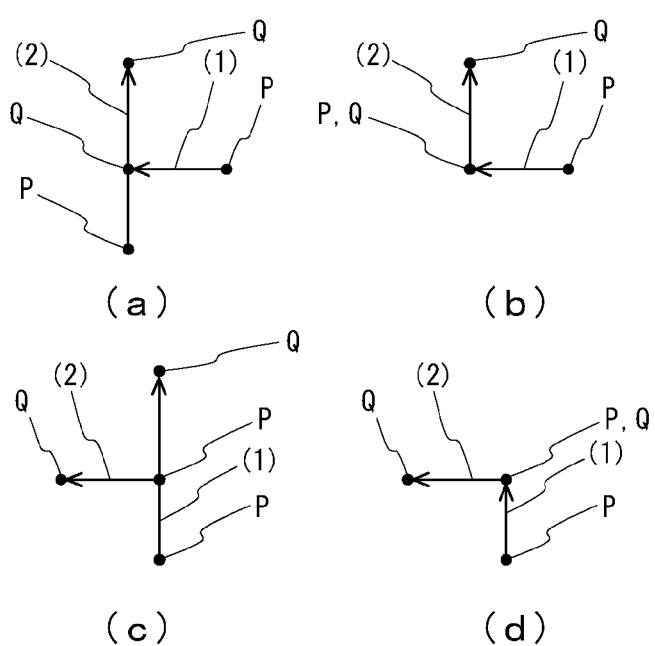
FIG. 17 is an explanatory diagram for explaining a process of a selected-entity correcting section of the second embodiment.

For example, as shown in FIG. 17(a), when the geometric entities (1) and (2) are successively selected, the geometric entities (1) and (2) intersect, and assume that the machining direction of the geometric entities (1) and (2) is an arrow direction, the geometric entity (2) is shortened as indicated in FIG. 17(b). Alternatively, as shown in FIG. 17(c), when the geometric entities (1) and (2) are successively selected, the geometric entities (1) and (2) intersect, and assume that the machining direction of the geometric entities (1) and (2) is an arrow direction, the geometric entity (1) is shortened as shown in FIG. 17(d). The symbols P and Q represent the starting point and the ending point set in the geometric entities (1) and (2), respectively.

Figure 18:
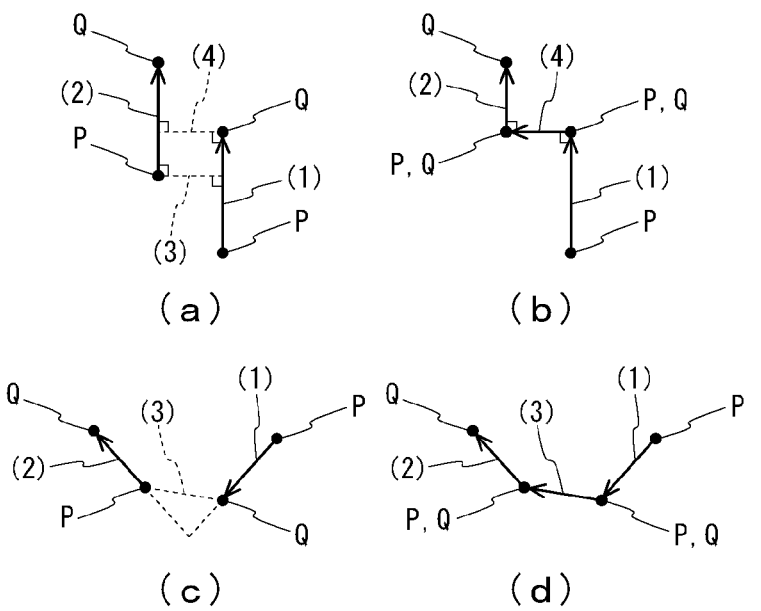
FIG. 18 is an explanatory diagram for explaining a process of the selected-entity correcting section of the second embodiment.

In the case where the type of machining is the outside diameter turning, the tool movement direction at the time of turning is the left direction, and the geometric entity which exists in the upper portion of the axial line of the workpiece is selected, when the geometric entities (1) and (2) as shown in FIG. 18(a), for example, are selected, the material of the workpiece is on the left side of the geometric entity, and thus, as shown in FIG. 18(b), the geometric entity (4) of which area of the machined portion to be removed from the workpiece by machining is smaller than that of the geometric entity (3) is added. Alternatively, in the case where the type of machining is the outside diameter turning, the tool movement direction at the time of turning is the left direction, and the geometric entity which exists in the upper portion of the axial line of the workpiece is selected, when the geometric entities (1) and (2) as shown in FIG. 18(c), for example, are selected, the material of the workpiece is on the left side of the geometric entity, similar to the above-described case, and thus, as shown in FIG. 18(d), the geometric entity (3) in which the area of the machined portion to be removed from the workpiece by machining is smaller as compared to the case where the geometric entities (1) and (2) are connected is added. The symbols P and Q represent the starting point and the ending point set in the geometric entities (1), (2), and (3), respectively.

The profile setting section 36 sets the machining profile based on the geometric entity which is confirmed by undergoing each process at the selected-entity recognizing section 31, the entity-selection-portion recognizing section 32, the selected-direction recognizing section 33, the machining-direction recognizing section 34, and the selected-entity correcting section 35 that a continuous line without bifurcation all the way from the starting point to the ending point can be formed, and based also on the geometric entity from which the continuous line becomes formable.

Figure 19:
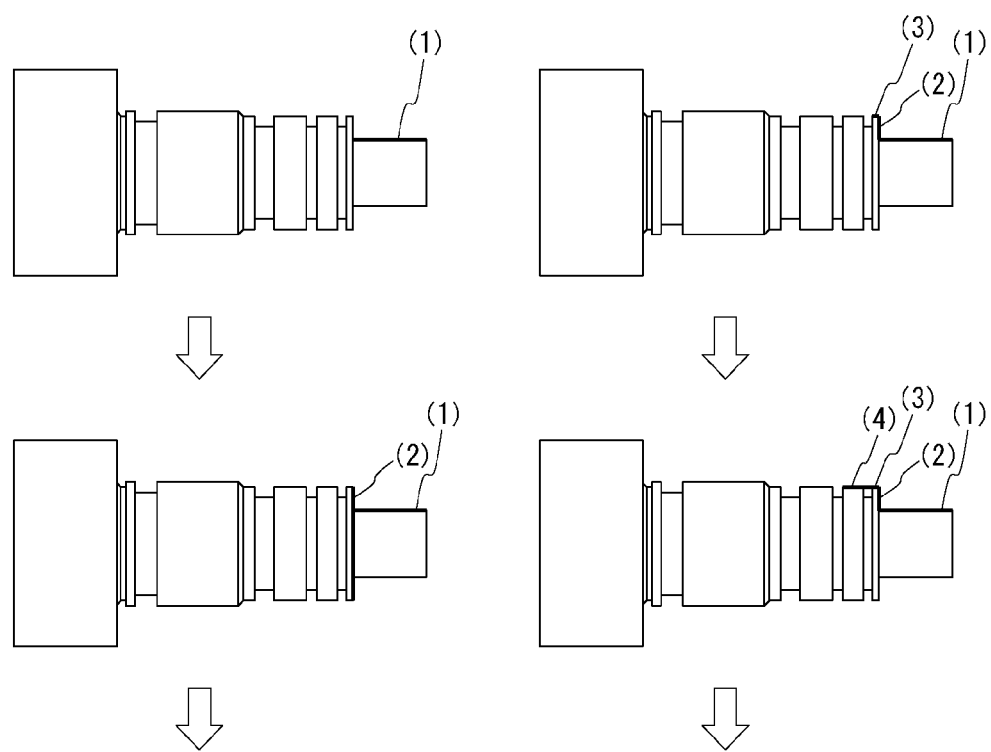
FIG. 19 is an explanatory diagram for explaining about selection of geometric entities in the second embodiment.
Figure 20:
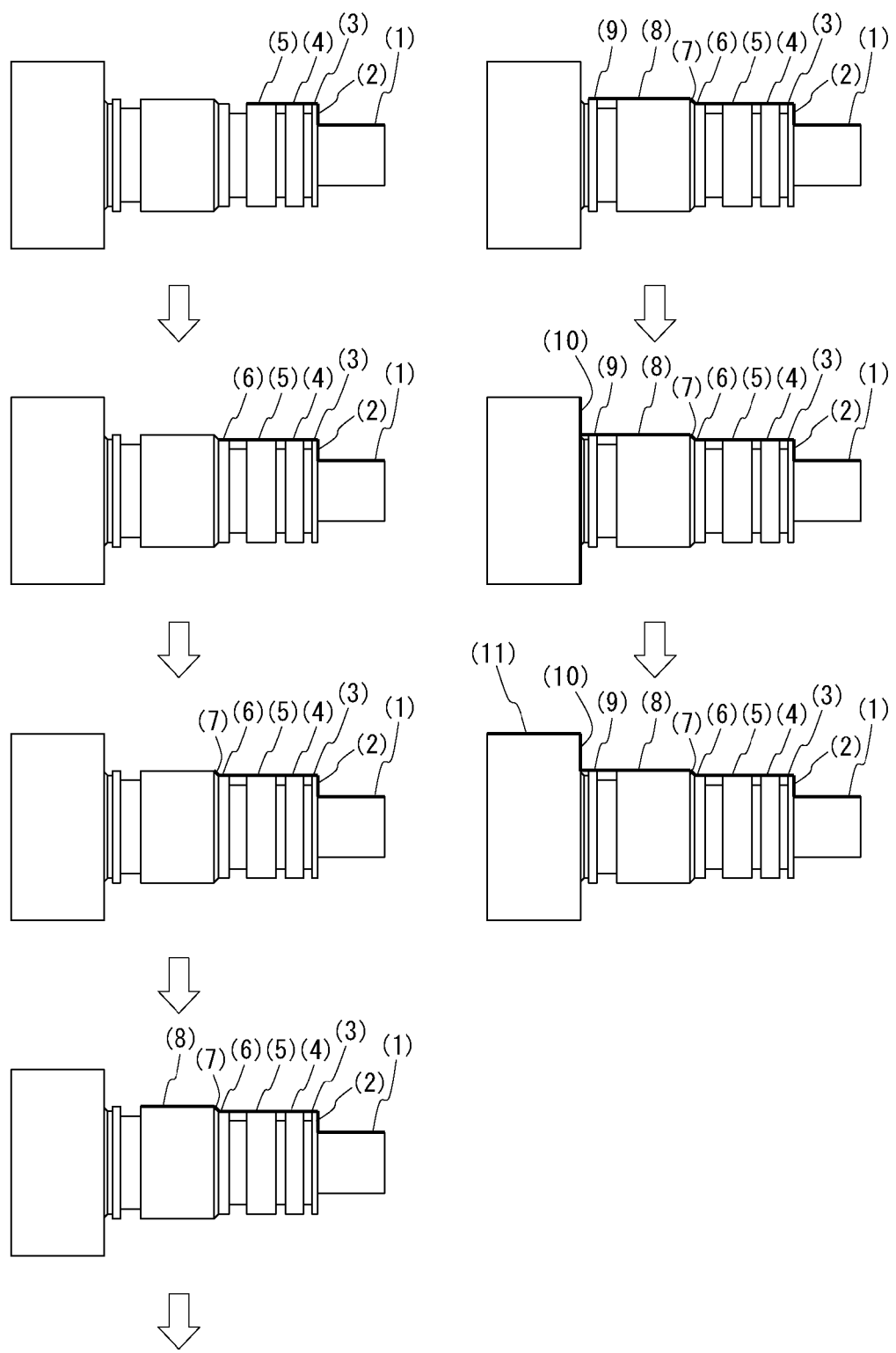
FIG. 20 is an explanatory diagram for explaining about selection of the geometric entities in the second embodiment.

According to the automatic programming device 2 according to the thus configured second embodiment, similar to the automatic programming device 1 according to the first embodiment, by the machining-profile setting processor 14, based on the selected-entity specifying data inputted from the input device 11, each of the geometric entities corresponding to the selected-entity specifying data is recognized, and based on the recognized geometric entities, the machining profile is set. At this time, when the continuous line without bifurcation all the way from the starting point to the ending point cannot be formed by the geometric entities recognized based on the selected-entity specifying data, the recognized geometric entities are corrected, a new geometric entity is added thereto, and lengths of these geometric entities are adjusted. Thereby, the continuous line becomes formable, and thereafter, the machining profile is set. As a result, as shown in FIG. 19 and FIG. 20, for example, only when the geometric entities (1) to (11), which are external shapes, are successively selected, the machining profile can be set. Further, in this way, when the continuous line without bifurcation all the way from the starting point to the ending point becomes formable, the contour shape of the machined portion can be clearly specified.

Based on the machining profile thus set or the like, the tool path data is generated by the CL-data generating processor 23, and based on the generated tool path data or the like, the NC program is generated by the NC-program generating processor 26.

Therefore, according to the automatic programming device 2 according to the embodiment, an effect similar to that of the automatic programming device 1 can be again obtained. Besides, one or both of the two geometric entities are extended to connect the both geometric entities; a new geometric entity is added between the two geometric entities such that out of each of the ends of the two geometric entities, the closer ends are connected by a straight line, a curved line or the like, to connect the both entities; and when a new geometric entity is added between the two geometric entities to connect the both geometric entities such that a vertical line is drawn to the other geometric entity from an end, which is the closer to the other geometric entity, of one of the two geometric entities, a plurality of possible connecting modes can be conceived, a connecting mode in which an area of the machined portion to be removed from the workpiece by machining is minimized as much as possible is adopted. Thus, it becomes possible to effectively prevent an excessive machining (excessive cutting) at the time of machining the workpiece.

As described above, the embodiments of the present invention are described, and a specific mode in which the present invention can be implemented is not limited to the above-described embodiments.

The automatic programming devices 1 and 2 are configured to generate the NC program for pocket-hole machining and for turning. The automatic programming devices are not limited thereto, and can be configured to generate an NC program for machining other than these.

Each process at the selected-entity correcting section 16 (the connection processor 17, the length adjusting processor 18, and the verifying processor 19) and the profile setting section 20, or each process at the entity-selection-portion recognizing section 32, the selected-direction recognizing section 33, the machining-direction recognizing section 34, the selected-entity correcting section 35, and the profile setting section 36 may be performed at either timing, i.e., at each time that the new geometric entity is recognized by the selected-entity recognizing sections 15 and 31; or after all the geometric entities are recognized by the selected-entity recognizing sections 15 and 31.

The automatic programming devices 1 and 2 may be configured as a single unit, or may be configured to be assembled into a control device of an NC machine tool.

INDUSTRIAL APPLICABILITY

As described above in detail, the present invention can be preferably applied to an automatic programming method which conversationally generates an NC program for controlling an NC machine tool and an automatic programming device thereof.

The invention claimed is:
1. An automatic programming method for conversationally generating an NC program for controlling an NC machine tool, the automatic programming method configured to execute:
an importing step for importing previously-created two-dimensional CAD data into setting means for setting a machining profile which is a contour shape of a portion to be machined by the NC machine tool;
an inputting step for inputting into the setting means selected-entity specifying data for specifying a geometric entity which is selected as the contour shape of the portion to be machined by the NC machine tool, out of geometric entities of a geometry defined by the two-dimensional CAD data imported in the importing step;
a machining-profile setting step in which by the setting means, based on selected-entity specifying data inputted in the inputting step, a geometric entity corresponding to the selected-entity specifying data is recognized, and based on the recognized geometric entity, the machining profile is set;

a Cutter Location-data (CL-data) generating step for generating, based on the machining profile set in the machining-profile setting step, tool path data related to a movement path of a tool moving along at least the machining profile; and an NC-program generating step for generating the NC program by converting the tool path data generated in the CL-data generating step, the automatic programming method, wherein the machining-profile setting step comprises:

a selected-entity recognizing step for recognizing, based on the selected-entity specifying data inputted in the inputting step, the geometric entity corresponding to the selected-entity specifying data;

a selected-entity correcting step, which confirms whether a continuous line without bifurcation all the way from a starting point to an ending point can be formed by the geometric entity recognized in the selected-entity recognizing step, when it is confirmed that the continuous line cannot be formed, confirms, with respect to the geometric entities recognized in the selected-entity recognizing step, whether two adjacent geometric entities have an intersection, and when it is confirmed that the two adjacent geometric entities do not have the intersection, performs a connecting process in which the two adjacent geometric entities are connected to each other by extending one or both of them or by adding a new geometric entity between them; and a profile-setting step in which when the continuous line can be formed by the geometric entity recognized in the selected-entity recognizing step, and when by the process performed in the selected-entity correcting step, it becomes possible to form the continuous line, the machining profile is set based on the geometric entity by which the continuous line can be formed.

2. The automatic programming method according to claim 1, wherein performing, after the connecting process, a length adjusting process in which it is confirmed whether ends of two adjacent geometric entities of the geometric entities which were objects of the connecting process coincide with each other, and when it is confirmed that they do not coincide with each other, one or both of the two adjacent geometric entities are shortened such that the ends of the two adjacent geometric entities coincide with each other.

3. The automatic programming method according to claim 2, wherein in the length adjusting process, with respect to the geometric entities which are objects of the length adjusting process, a starting point and an ending point are set, and thereafter, one or both of two adjacent geometric entities are shortened to bring the starting point and the ending point of the two adjacent geometric entities into coincidence with each other.

4. The automatic programming method according to claim 3, wherein when the two adjacent geometric entities are connected to each other by adding a new geometric entity between them in the connection process, if there are a plurality of connecting modes, a connecting mode capable of minimizing an area to be removed from a workpiece by machining the portion to be machined by the NC machine tool is adopted.

5. The automatic programming method according to claim 3, wherein performing, after the length adjusting process, an inspection process in which it is confirmed whether each of the geometric entities recognized in the selected-entity recognizing step intersects another geometric entity other than the geometric entities to be adjacent thereto.

6. The automatic programming method according to claim 2, wherein performing, after the length adjusting process, an inspection process in which it is confirmed whether each of the geometric entities recognized in the selected-entity recognizing step intersects another geometric entity other than the geometric entities to be adjacent thereto.

7. The automatic programming method according to claim 6, wherein when the two adjacent geometric entities are connected to each other by adding a new geometric entity between them in the connection process, if there are a plurality of connecting modes, a connecting mode capable of minimizing an area to be removed from a workpiece by machining the portion to be machined by the NC machine tool is adopted.

8. The automatic programming method according to claim 2, wherein when the two adjacent geometric entities are connected to each other by adding a new geometric entity between them in the connection process, if there are a plurality of connecting modes, a connecting mode capable of minimizing an area to be removed from a workpiece by machining the portion to be machined by the NC machine tool is adopted.

9. The automatic programming method according to claim 1, wherein when the two adjacent geometric entities are connected to each other by adding a new geometric entity between them in the connection process, if there are a plurality of connecting modes, a connecting mode capable of minimizing an area to be removed from a workpiece by machining the portion to be machined by the NC machine tool is adopted.

10. An automatic programming device for conversationally generating an NC program for controlling an NC machine tool, the automatic programming device, comprising:

CAD-data importing means for importing previously-created two-dimensional CAD data;

machining-profile setting means for recognizing, based on selected-entity specifying data, successively inputted from outside, for specifying a geometric entity selected as a contour shape of a portion to be machined by the NC machine tool, out of geometric entities of a geometry defined by the two-dimensional CAD data imported by the CAD-data importing means, geometric entities corresponding to the data, and based on recognized geometric entities, setting a machining profile which is the contour shape of a portion to be machined by the NC machine tool;

CL-data generating means for generating, based on the machining profile set by the machining-profile setting means, tool path data related to a movement path of a tool moving along at least the machining profile; and NC-program generating means for generating the NC program by converting the tool path data generated by the CL-data generating means, wherein the machining-profile setting means comprises:

a selected-entity recognizing section for recognizing, based on the selected-entity specifying data successively inputted from outside, geometric entities corresponding to the selected-entity specifying data;

a selected-entity correcting section which confirms whether a continuous line without bifurcation all the way from a starting point to an ending point can be formed by the geometric entities recognized by the selected-entity recognizing section, when it is confirmed that the continuous line cannot be formed, confirms, with respect to the geometric entities recognized by the selected-entity recognizing section, whether two adjacent geometric entities have an intersection, and when it is confirmed that the two adjacent geometric entities do not have the intersection, performs a connecting process in which the two adjacent geometric entities are connected to each other by extending one or both of them or by adding a new geometric entity between them; and a profile setting section in which when the continuous line can be formed by the geometric entities recognized by the selected-entity recognizing section, and when by the connecting process performed in the selected-entity correcting section, it becomes possible to form the continuous line, the machining profile is set based on the geometric entities by which the continuous line can be formed.

11. The automatic programming device according to claim 10, wherein the selected-entity correcting section is configured to perform;

after the connecting process, a length adjusting process in which it is confirmed whether ends of two adjacent geometric entities of the geometric entities which were objects of the connecting process coincide with each other, and when it is confirmed that they do not coincide with each other, one or both of the two adjacent geometric entities are shortened such that the ends of the two adjacent geometric entities coincide with each other.

12. The automatic programming device according to claim 10, wherein the selected-entity correcting section is configured such that, when a the two adjacent geometric entities are connected to each other by adding a new geometric entity between them in the connection process, if there are a plurality of connecting modes, a connecting mode capable of minimizing an area to be removed from a workpiece by machining the portion to be machined by the NC machine tool is adopted.

13. The automatic programming device according to claim 11, wherein the selected-entity correcting section is configured to perform, after the length adjusting process, an inspection process in which it is confirmed whether each of the geometric entities recognized by the selected-entity recognizing section intersects another geometric entity other than the geometric entities to be adjacent thereto.

14. The automatic programming device according to claim 13, wherein the selected-entity correcting section is configured such that, when the two adjacent geometric entities are connected to each other by adding a new geometric entity between them in the connection process, if there are a plurality of connecting modes, a connecting mode capable of minimizing an area to be removed from a workpiece by machining the portion to be machined by the NC machine tool is adopted.

15. The automatic programming device according to claim 11, wherein the selected-entity correcting section is configured such that in the length adjusting process, with respect to the geometric entities which are objects of the length adjusting process, a starting point and an ending point are set, and thereafter, one or both of two adjacent geometric entities are shortened to bring the starting point and the ending point of the two adjacent geometric entities into coincidence with each other.

16. The automatic programming device according to claim 15, wherein the selected-entity correcting section is configured such that, when the two adjacent geometric entities are connected to each other by adding a new geometric entity between them in the connection process, if there are a plurality of connecting modes, a connecting mode capable of minimizing an area to be removed from a workpiece by machining the portion to be machined by the NC machine tool is adopted.

17. The automatic programming device according to claim 15, wherein the selected-entity correcting section is configured to perform, after the length adjusting process, an inspection process in which it is confirmed whether each of the geometric entities recognized by the selected-entity recognizing section intersects another geometric entity other than the geometric entities to be adjacent thereto.

18. The automatic programming device according to claim 17, wherein the selected-entity correcting section is configured such that, when the two adjacent geometric entities are connected to each other by adding a new geometric entity between them in the connection process, if there are a plurality of connecting modes, a connecting mode capable of minimizing an area to be removed from a workpiece by machining the portion to be machined by the NC machine tool is adopted.

19. The automatic programming device according to claim 11, wherein the selected-entity correcting section is configured such that, when the two adjacent geometric entities are connected to each other by adding a new geometric entity between them in the connection process, if there are a plurality of connecting modes, a connecting mode capable of minimize an area to be removed from a workpiece by machining the portion to be machined by the NC machine tool is adopted.

20. The automatic programming method according to claim 5, wherein when the two adjacent geometric entities are connected to each other by adding a new geometric entity between them in the connection process, if there are a plurality of connecting modes, a connecting mode capable of minimizing an area to be removed from a workpiece by machining the portion to be machined by the NC machine tool is adopted.

* * * * *